(12) United States Patent
Claridge et al.

(10) Patent No.: US 11,420,737 B2
(45) Date of Patent: Aug. 23, 2022

(54) HIGH SPEED MULTI-ROTOR VERTICAL TAKEOFF AND LANDING AIRCRAFT

(71) Applicant: xCraft Enterprises, Inc., Coeur d'Alene, ID (US)

(72) Inventors: Jerry Daniel Claridge, Sandpoint, ID (US); Charles Fischer Manning, Sandpoint, ID (US)

(73) Assignee: xCraft Enterprises, Inc., Coeur d'Alene, ID (US)

( * ) Notice: Subject to any disclaimer, the term of this patent is extended or adjusted under 35 U.S.C. 154(b) by 0 days.

(21) Appl. No.: 17/119,113

(22) Filed: Dec. 11, 2020

(65) Prior Publication Data

US 2022/0024561 A1    Jan. 27, 2022

Related U.S. Application Data

(63) Continuation of application No. 16/005,345, filed on Jun. 11, 2018, now abandoned, which is a
(Continued)

(51) Int. Cl.
*B64C 29/02* (2006.01)
*B64C 39/02* (2006.01)

(52) U.S. Cl.
CPC ............ *B64C 29/02* (2013.01); *B64C 39/024* (2013.01); *B64C 2201/021* (2013.01);
(Continued)

(58) Field of Classification Search
CPC ....... B64C 29/02; B64C 29/024; Y02E 10/70; Y02E 10/72; F03D 9/11; F03D 9/20; F03D 9/25; F03D 5/00
See application file for complete search history.

(56) References Cited

U.S. PATENT DOCUMENTS

| 2,328,786 A | 9/1943 | Crowser |
| 3,081,964 A | 3/1963 | Quenzler |

(Continued)

FOREIGN PATENT DOCUMENTS

| CN | 101886927 A | 11/2010 |
| CN | 104062979 A | 9/2019 |

(Continued)

OTHER PUBLICATIONS

Ackerman, E., "A Smartphone is the Brain for This Autonomous Quadcopter," Jan. 31, 2015, retrieved from <http://spectrum.ieee.org/automaton/robotics/drones/a-smartphone-is-the-brain-for-this-autonomous-quadcopter>, 2 pages.
(Continued)

*Primary Examiner* — Michael H Wang
(74) *Attorney, Agent, or Firm* — Perkins Coie LLP

(57) ABSTRACT

This disclosure is generally directed to a High Speed vertical takeoff and landing (VTOL) aircraft that includes fixed wing flight capabilities. The High Speed VTOL aircraft may include at least two thrust producing rotors located equidistant from a longitudinal axis of the aircraft on a main wing, and at least two thrust producing rotors located equidistant from a longitudinal axis of the aircraft on a vertical wing. The rotors may be driven by electric motors. However, other power sources may be used such as combustion or hybrid engines. By adjusting the speed and/or the pitch of the rotors, the aircraft can transition from a vertical flight configuration to a horizontal flight configuration and back.

16 Claims, 15 Drawing Sheets

Related U.S. Application Data continuation of application No. 14/554,892, filed on Nov. 26, 2014, now Pat. No. 9,994,313.

(52) U.S. Cl.
CPC .. *B64C 2201/027* (2013.01); *B64C 2201/042* (2013.01); *B64C 2201/104* (2013.01); *B64C 2201/108* (2013.01)

(56) References Cited

U.S. PATENT DOCUMENTS

| | | | |
|---|---|---|---|
| 3,096,952 A | 7/1963 | Roppel | |
| 3,120,359 A | 2/1964 | Sprecher | |
| 3,184,184 A | 5/1965 | Dorman | |
| 3,350,035 A | 10/1967 | Schlieben | |
| 3,485,462 A * | 12/1969 | Spence | B64D 27/10 244/58 |
| 3,514,052 A | 5/1970 | McKeown | |
| 4,503,673 A * | 3/1985 | Schachle | F03D 15/00 416/41 |
| 5,289,994 A * | 3/1994 | Del Campo Aguilera | B64C 39/024 244/17.23 |
| 5,589,901 A | 12/1996 | Means | |
| 6,445,983 B1 | 9/2002 | Dickson | |
| 6,561,455 B2 | 5/2003 | Capanna | |
| 8,170,728 B2 | 5/2012 | Roesch | |
| 8,356,770 B2 | 1/2013 | Parks | |
| 8,616,492 B2 | 12/2013 | Oliver | |
| 9,075,415 B2 | 7/2015 | Kugelmass | |
| 9,334,049 B1 * | 5/2016 | LeGrand, III | B64C 13/00 |
| 9,409,645 B1 | 8/2016 | Sopper | |
| 9,738,380 B2 | 8/2017 | Claridge | |
| 9,994,313 B2 | 6/2018 | Claridge | |
| 10,479,500 B2 | 11/2019 | Claridge | |
| 2002/0074452 A1 | 6/2002 | Ingram | |
| 2003/0094537 A1 * | 5/2003 | Austen-Brown | B64C 29/0033 244/7 R |
| 2005/0146458 A1 | 7/2005 | Carmichael | |
| 2005/0178879 A1 | 8/2005 | Mao | |
| 2007/0228221 A1 | 10/2007 | Segal | |
| 2009/0314883 A1 | 12/2009 | Arlton et al. | |
| 2010/0168937 A1 | 7/2010 | Soijer | |
| 2010/0243794 A1 | 9/2010 | Jermyn | |
| 2010/0243821 A1 | 9/2010 | Lim | |
| 2011/0001020 A1 | 1/2011 | Forgac | |
| 2011/0139923 A1 | 6/2011 | Papanikolopoulos | |
| 2011/0168835 A1 | 7/2011 | Oliver | |
| 2011/0288684 A1 | 11/2011 | Farlow | |
| 2012/0026166 A1 | 2/2012 | Takeda | |
| 2012/0234968 A1 * | 9/2012 | Smith | B64D 17/64 244/12.3 |
| 2013/0238168 A1 | 9/2013 | Reyes | |
| 2013/0251525 A1 | 9/2013 | Saiz | |
| 2014/0008498 A1 | 1/2014 | Reiter | |
| 2014/0151496 A1 | 6/2014 | Shaw | |
| 2014/0180914 A1 | 6/2014 | Abhyanker | |
| 2014/0217229 A1 | 8/2014 | Chan | |
| 2014/0249693 A1 | 9/2014 | Stark | |
| 2014/0288730 A1 | 9/2014 | Fucke | |
| 2014/0297067 A1 | 10/2014 | Malay | |
| 2014/0312177 A1 | 10/2014 | Gaonjur | |
| 2015/0102154 A1 | 4/2015 | Duncan et al. | |
| 2015/0175263 A1 | 6/2015 | Reyes | |
| 2015/0225071 A1 | 8/2015 | Tighe | |
| 2015/0232181 A1 | 8/2015 | Oakley et al. | |
| 2015/0266571 A1 | 9/2015 | Bevirt | |
| 2015/0284079 A1 | 10/2015 | Matsuda | |
| 2015/0353206 A1 | 12/2015 | Wang | |
| 2016/0001879 A1 | 1/2016 | Johannessen | |
| 2016/0068266 A1 * | 3/2016 | Carroll | B64D 27/24 244/53 R |
| 2016/0114887 A1 * | 4/2016 | Zhou | G06Q 20/367 348/148 |
| 2016/0378120 A1 | 12/2016 | Creasman | |
| 2017/0008625 A1 * | 1/2017 | Olm | B64C 39/024 |
| 2017/0139424 A1 | 5/2017 | Li | |
| 2017/0160735 A1 | 6/2017 | Mikan et al. | |
| 2018/0002027 A1 * | 1/2018 | McCullough | B64C 29/02 |
| 2018/0290744 A1 | 10/2018 | Claridge | |
| 2018/0327091 A1 | 11/2018 | Burks | |
| 2018/0354615 A1 * | 12/2018 | Groninga | B64C 3/385 |
| 2019/0135428 A1 | 5/2019 | Claridge | |
| 2019/0185159 A1 | 6/2019 | Russell | |
| 2019/0220819 A1 | 7/2019 | Banvait et al. | |
| 2019/0313228 A1 | 10/2019 | Ferreira et al. | |
| 2019/0385442 A1 | 12/2019 | Perez Barrera et al. | |
| 2020/0057445 A1 | 2/2020 | Bennie et al. | |
| 2020/0062419 A1 | 2/2020 | Jimenez Hernandez et al. | |
| 2020/0087004 A1 | 3/2020 | Wong | |
| 2020/0102093 A1 | 4/2020 | Claridge et al. | |

FOREIGN PATENT DOCUMENTS

| | | | |
|---|---|---|---|
| DE | 102013011378 A1 | 1/2015 | |
| GB | 2281761 A * | 3/1995 | F03B 17/067 |

OTHER PUBLICATIONS

Corrected Notice of Allowability dated Feb. 9, 2018 in U.S. Appl. No. 14/554,982 for Claridge, J.D., 5 pages.
Examination Report dated Apr. 6, 2020 in European Patent Application No. 16765374.0, 5 pages.
Examination Report dated Jun. 25, 2019 in European Patent Application No. 16765374.0, 7 pages.
Extended European Search Report dated Jun. 4, 2018 in European Patent Application No. 15862818.0, 9 pages.
Extended European Search Report dated Sep. 21, 2018 in European Patent Application No. 16765374.0, 14 pages.
Final Office Action dated Jan. 22, 2019 in U.S. Appl. No. 15/681,835, for Claridge et al., filed Aug. 21, 2017, 6 pages.
Final Office Action dated Jan. 24, 2020 in U.S. Appl. No. 16/005,345, for Claridge et al., filed Jun. 11, 2018, 21 pages.
Final Office Action dated Nov. 18, 2016 in U.S. Appl. No. 14/554,892 for Claridge et al., filed Nov. 26, 2014, 20 pages.
Final Office Action dated Oct. 5, 2017 in U.S. Appl. No. 14/554,892 for Claridge et al., filed Nov. 26, 2014, 12 pages.
First Examination Report dated Aug. 6, 2018 in Australian Patent Application No. 2016233871, 6 pages.
First Examination Report dated Jul. 16, 2018 in Australian Patent Application No. 2015354671, 5 pages.
First Examination Report dated Jun. 2, 2020 in Australian Patent Application No. 2019206088, 5 pages.
First Examination Report dated Oct. 22, 2020 in Australian Patent Application No. 2019246869, 5 pages.
First Office Action dated Aug. 26, 2019 in Chinese Patent Application No. 201510828899.0, 8 pages.
First Office Action dated May 8, 2019 in Chinese Patent Application No. 201680016062.9, 8 pages.
International Search Report and Written Opinion dated Apr. 8, 2016, in International Patent Application No. PCT/US15/57722, 13 pages.
International Search Report and Written Opinion dated Jun. 2, 2016 in International Patent Application No. PCT/US16/16004, 14 pages.
Kim, N. et al., "LAB: The Living Aerial Bot by LabRomance Inc.—Kickstarterlab-the-living-aeria," Kickstarter.com, Feb. 1, 2015, retrieved from <https://www.kickstarter.com/projects/labromance/lab-the-living-aerial-bot>, 22 pages.
Leichtfried, M. et al., "Autonomous Flight using a Smartphone as On-Board Processing Unit in GPS-Denied Environments," International Conference on Advances in Mobile Computing & Multimedia, 10 pages.
Madrigal, "Inside Google's Secret Drone-Delivery Program," retrieved on Nov. 26, 2014 at <http://www.theatlantic.com/technology/archive/2014/08/inside-googles-secret-drone-delivery-program/379306/>, 34 pages.
Non-Final Office Action dated Apr. 4, 2019 in U.S. Appl. No. 16/005,345 for Claridge et al., filed Jun. 11, 2018, 19 pages.
Non-Final Office Action dated Dec. 6, 2016 in U.S. Appl. No.

(56) References Cited

OTHER PUBLICATIONS

14/658,689, for Claridge et al., filed Mar. 16, 2015, 10 pages.
Non-Final Office Action dated Jan. 10, 2019 in U.S. Appl. No. 16/004,924 for Claridge et al., filed Jun. 11, 2018, 18 pages.
Non-Final Office Action dated Jun. 11, 2020 in U.S. Appl. No. 16/005,345 for Claridge et al., filed Jun. 11, 2018, 22 pages.
Non-Final Office Action dated Mar. 23, 2017 in U.S. Appl. No. 14/554,892 for Claridge et al., filed Nov. 26, 2014, 21 pages.
Non-Final Office Action dated May 6, 2016 in U.S. Appl. No. 14/554,892 for Claridge et al., filed Nov. 26, 2014.
Non-Final Office Action dated Sep. 14, 2018 in U.S. Appl. No. 15/681,835, for Claridge et al., filed Aug. 21, 2017, 10 pages.
Notice of Allowance dated Jan. 16, 2018 in U.S. Appl. No. 14/554,892, for Claridge et al., filed Nov. 26, 2014, 8 pages..
Notice of Allowance dated Jul. 8, 2019 in U.S. Appl. No. 15/681,835 for Claridge et al., filed Aug. 21, 2017, 15 pages.
Notice of Allowance dated Mar. 22, 2017 in U.S. Appl. No. 14/658,689, for Claridge et al., filed Mar. 16, 2015, 5 pages.
Notice of Allowance dated May 14, 2019 in U.S. Appl. No. 15/681,835, for Claridge et al., filed Aug. 21, 2017, 5 pages.
Second Office Action dated Dec. 13, 2019 in Chinese Patent Application No. 201680016062.9, 4 pages.
Second Office Action dated Mar. 19, 2020 in Chinese Patent Application No. 201510828899.0, 3 pages.
Tomkins, M., "The drone of your dreams: DJI inspires with 4k-shooting, 360-degree, transforming quadcopter," Nov. 13, 2014, retrieved from <http://www.imaging-resource.com/news/2014/11/13/drone-of-your-dreams-dji-inspire-4k-360-degree-transforming-quadcopter>.
Non-Final Office Action dated Mar. 10, 2022 in U.S. Appl. No. 16/590,023 for Claridge et al., filed Oct. 1, 2019, 10 pages.

\* cited by examiner

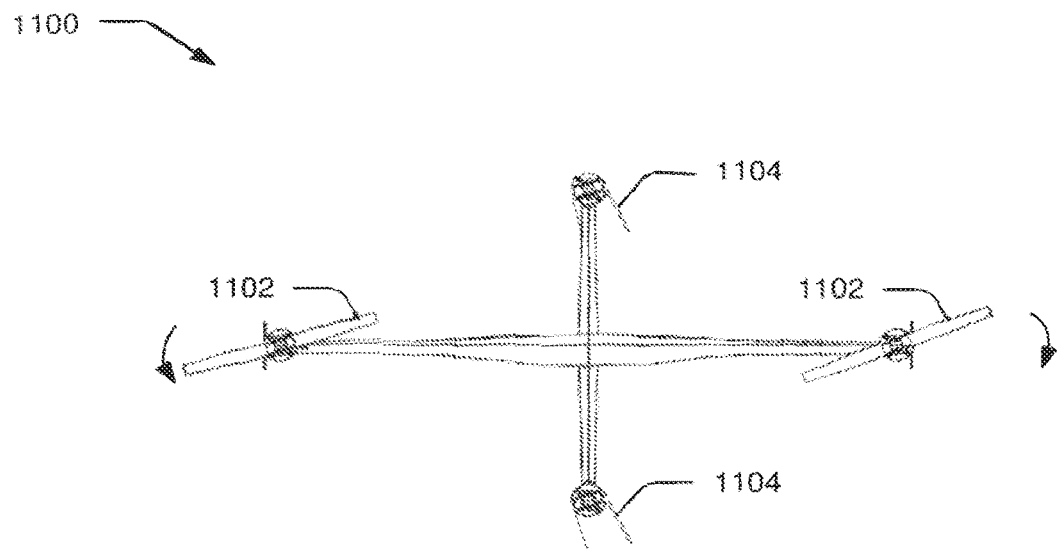
FIG. 11A
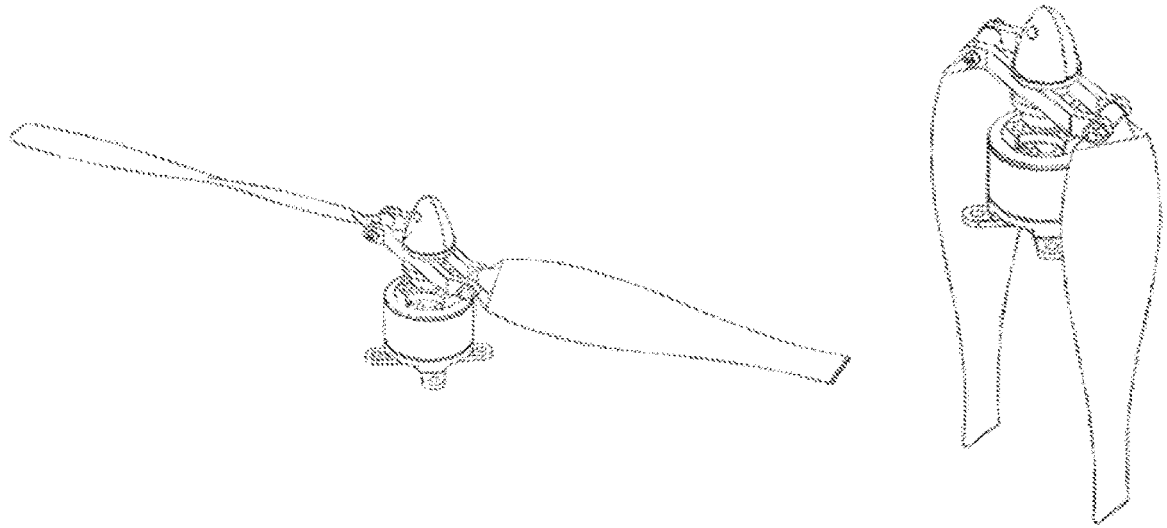
FIG. 11B  FIG. 11C

HIGH SPEED MULTI-ROTOR VERTICAL TAKEOFF AND LANDING AIRCRAFT

RELATED APPLICATIONS

This Application is a continuation of U.S. patent application Ser. No. 16/005,345, filed Jun. 11, 2018, which is a continuation of and claims priority to U.S. patent application Ser. No. 14/554,892, now U.S. Pat. No. 9,994,313, filed Nov. 26, 2014, both of which are incorporated herein by reference.

BACKGROUND

The field of aviation encompasses many different versions of manned and unmanned aircraft. The vast majority of readily accessible, affordable manned and unmanned aircraft are fixed wing designs that require the use of a hangar or ramp space for storage, and an air strip for take-off and landing. To obviate this need, in some cases, tools are used to minimize the need for ramps or landing areas through the use of sling-shot mechanisms (for takeoff) or landing catches (for landing). In either case, the ease and efficiency of fixed wing design is often off-set by the need of ramp space or these additional tools. These requirements increase the overall cost of operating the aircraft, and can render it inaccessible to the average citizen. In addition, most manned and unmanned aircraft rely on traditional controls and require training and expertise to operate them. The degree of difficulty and knowledge required to operate these aircraft is often multiple times that of driving a traditional automobile, which may limit access to and growth in the industry.

In contrast, High Speed vertical takeoff and landing (VTOL) aircraft can be operated without use of an air strip. A large number of VTOL aircraft in use today are in the form of tilt-rotor, ducted, and dedicated lift system aircraft, and are employed by various militaries throughout the world. The overall complexity of the tilt-rotor aircraft generally limits their use to well trained, professional pilots. However, the many advantages of the tilt-rotor platform, including vertical lifting capabilities combined with the speed and efficiency of a conventional fixed wing aircraft, if available to the general public, could revolutionize the aviation industry.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3A shows the VTOL aircraft with main wing loading. FIG. 3B shows the VTOL aircraft with vertical wing loading.

FIG. 7 depicts the VTOL aircraft in a landed position.

FIG. 8 are vertical views of an unmanned version of the illustrative High Speed Multi-Rotor VTOL aircraft shown in FIG. 7, in flight.

FIG. 9 depicts the VTOL aircraft hovering in a nose-down configuration.

FIG. 11 are various views of a foldable rotor. FIG. 11A is a perspective view of an illustrative High Speed Multi-Rotor VTOL aircraft in forward flight, with two rotors folded and two rotors extended. FIG. 11B is perspective view of the foldable rotor in the extended position. FIG. 11C is a perspective view of a foldable rotor in a folded position.

DETAILED DESCRIPTION

Overview

Figure 1A:
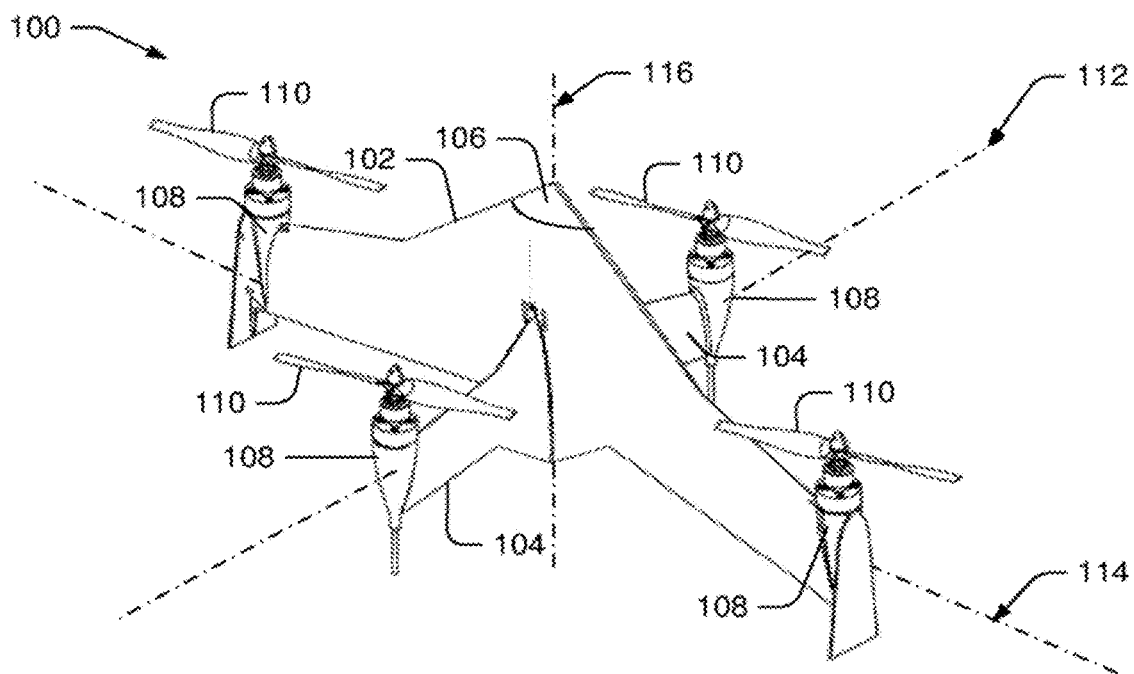
FIGS. 1A and 1B are perspective views of an illustrative High Speed Multi-Rotor vertical takeoff and landing (VTOL) aircraft.

This disclosure is generally directed to a vertical takeoff and landing (VTOL) aircraft that includes fixed wing flight capabilities. As discussed above, various types of VTOL aircraft exist in the aviation industry. Some types, such as the V-22 Osprey, employ large rotating nacelles to effect a transition from a vertical to a horizontal flight configuration. Other embodiments employ rotating exhaust ports to effect the transition. Still others, such as tail sitters use thrust generating sources across different planes to effect a transition from vertical to horizontal flight. However, various embodiments described herein provide an improved design in the VTOL aircraft market. For example, in at least one embodiment, the VTOL aircraft may include multiple variable speed and variable pitch rotors mounted on the same plane, equidistant from each other. Each of the multiple rotors may adjust speed and pitch independently of the other rotors, allowing for rotation and control about any aircraft axis. Various embodiments of the VTOL aircraft described herein may also transition between different orientations, such as, for example, between a primary wing loading orientation and a secondary wing loading orientation, which may permit different aircraft limits, such as, for example, an increased airspeed limitation in the secondary wing loading orientation.

Various embodiments of the VTOL aircraft may include a propulsion system comprising at least two engines and/or motors located equidistant from a longitudinal axis of the aircraft on a main wing, and at least two engines and/or motors located equidistant from a longitudinal axis of the aircraft on a vertical wing. The propulsion system may be driven by electric motors. However, other power sources may be used such as combustion or hybrid engines. By adjusting the power generated by each motor and/or engine, the aircraft may transition from a vertical flight configuration to a horizontal flight configuration and back. The aircraft may take off without use of an airstrip by liftoff into the vertical flight configuration. While in the vertical flight configuration, the propulsion system may generate thrust that is directed primarily perpendicular to the horizon. Once the aircraft has gained altitude in the vertical flight configuration, the aircraft may transition to a forward-flight mode where the propulsion system generates centerline thrust directed primarily toward the aft end of the aircraft. The propulsion system may later transition back to the vertical flight configuration to enable the aircraft to land without use of an airstrip.

The VTOL aircraft may be a manned aircraft, an unmanned aerial vehicle (UAV) or a remote-controlled aircraft. The VTOL aircraft may include main (i.e., primary) and vertical (i.e., secondary) wings to enable prolonged forward flight with lift generated by the wings. The main and vertical wings may have a symmetrical or asymmetrical camber. The aircraft may sustain the forward flight with the main wings as the primary lift surface. In some embodiments, the aircraft may transition from the main wing to the vertical wing as the primary lift surface, for example, by rotating approximately 90 degrees about a centerline axis. The rotors may provide directed thrust to provide pitch, roll, and yaw control of the aircraft. In some embodiments, the wings may include control surfaces such as ailerons, elevators, rudders, elevons, flaps, flaperons, and any other control surfaces necessary to control the aircraft in forward flight.

In accordance with various embodiments, the VTOL aircraft may employ a control management system that controls and sustains flight in various flight configurations (including, but not limited to, vertical flight, transition, horizontal flight, and combinations thereof). The VTOL aircraft may be flown in both semi-autonomous and fully autonomous flight modes. In semi-autonomous flight, operation of the aircraft may be performed by providing simple directional commands from operator controls to the control management system, which in turn executes the commands while taking other necessary action to sustain flight and/or avoid objects in the surrounding environment. Thus, control of the aircraft from the operator's perspective may be akin to control of an aircraft in a video game, and may be made possible with minimal training or aviation expertise.

In various embodiments of fully autonomous flight, the VTOL aircraft may have a flight plan loaded into the control management system, the flight plan directing the configuration and/or navigation of the VTOL aircraft. Additionally or alternatively, the VTOL aircraft may be capable of fully autonomous flight in an emergency situation. For example, if an operator becomes incapacitated, the VTOL aircraft may be configured for an automatic recovery function in which the aircraft may establish a hover and land in the vertical flight configuration without input from an operator. For another example, the VTOL aircraft may enable the automatic recovery function upon lost contact with a remote operator.

The apparatuses, systems, and techniques described herein may be implemented in a number of ways. Example embodiments are provided below with reference to the following figures.

It is understood that the vertical flight configuration may encompass a hover and/or hovering the VTOL aircraft. The terms may vertical flight configuration, vertical flight mode, and hover mode may be used interchangeably. Additionally, or alternatively, the horizontal flight configuration is equivalent to a forward flight mode, and the two terms may be used interchangeably.

Illustrative Embodiment

Figure 1B:
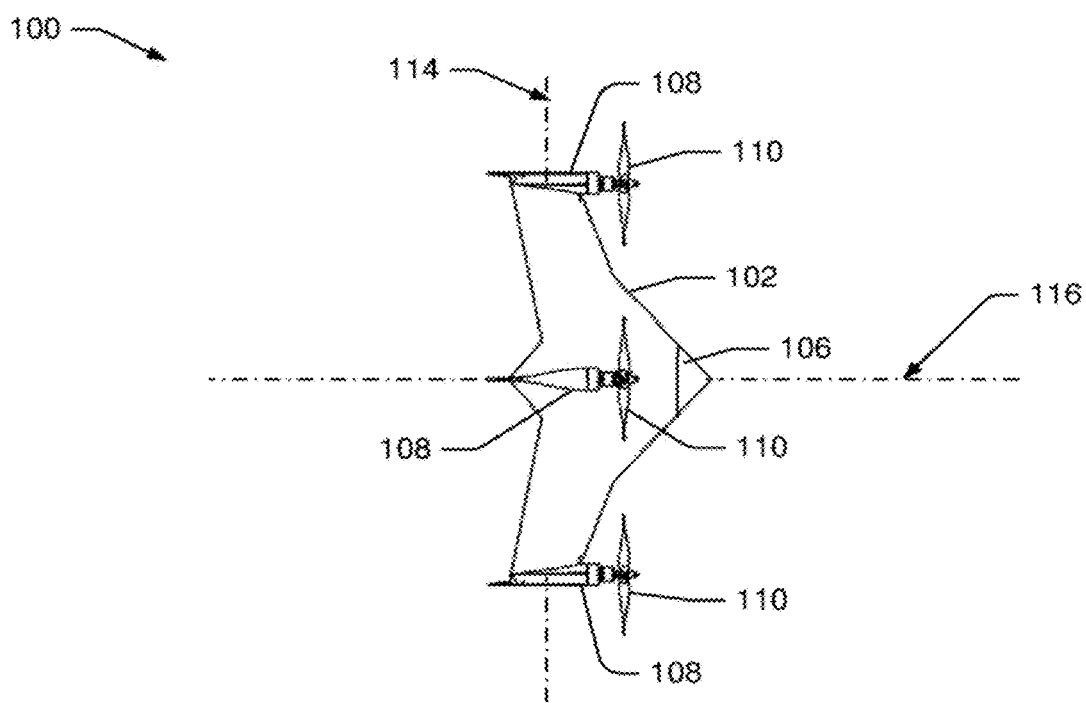

FIGS. 1A and 1B are perspective views of an illustrative High Speed Multi-Rotor vertical takeoff and landing (VTOL) aircraft.

FIG. 1A is a perspective view of an illustrative High Speed Multi-Rotor VTOL aircraft 100 while the aircraft is in a vertical flight configuration. The aircraft in FIG. 1 has a main wing 102 (i.e., a first wing) and a vertical wing 104 (i.e., a second wing). The structure of the VTOL aircraft 100 may be monocoque, semi-monocoque, or may include trusses, unibodies, and/or stressed skin. The VTOL aircraft 100 may be made of carbon fiber, titanium, aluminum, or any other material appropriate for aircraft construction. The aircraft skin may be a low friction surface that may include built-in solar cells.

In various embodiments, the VTOL aircraft 100 may include storage pod 106 on the aircraft. In such embodiments, the storage pod 106 may be used to house cameras (i.e., still, video, digital, forward-looking infra-red, range, electronically stabilized platforms, etc.), communication equipment (i.e., computers, antennae, etc.), collision avoidance systems, or any other reasonable payload. In the illustrative example, the storage pod 106 is located at the nose of the aircraft. However, the storage pod may be located at another position in the VTOL aircraft 100, such as in a wing, in a fuselage, at an aft end, etc.

In various embodiments, storage pod 106 may be encapsulated by a canopy. In such embodiments, the canopy may be made of a plastic material (e.g., high-density polyethylene, acrylic, melamine, polycarbonate, etc.), a glass material, or any other transparent material capable of withstanding a potential impact. The canopy may provide a weatherproof environment to protect the equipment in the storage pod 106. In some embodiments, the storage pod 106 may be encapsulated by the aircraft skin, and may include a window for the camera, antennae, etc.

FIGS. 1A and 1B depict VTOL aircraft 100 configured for unmanned flight. In some embodiments, the VTOL aircraft 100 may include a cockpit. In such embodiments, the cockpit may include space for one or more passengers and/or other payload. The cockpit may include a cockpit canopy that provides a weatherproof and relatively quiet environment. The cockpit canopy may be formed of a plastic material, a glass material, or any other transparent material capable of withstanding a potential impact.

As illustrated in FIGS. 1A and 1B, VTOL aircraft 100 may include at least four motors 108, two on the main wing and two on the vertical wing. In some embodiments, aircraft 100 may include more than two motors on the main wing and more than two motors on the vertical wing. In some embodiments, aircraft 100 may include fewer than two motors on the main wing and fewer than two motors on the vertical wing. In various embodiments, motors 108 may comprise electric motors. However, other propulsion systems are imagined, such as full combustion engines (e.g., gas turbine, jet engine, diesel engine, etc.), or hybrid engines (i.e., an engine used to convert liquid fuel to electrical energy to drive an electric motor and/or a fuel powered generator used to provide electrical power to the electric motors).

In various embodiments, motors 108 may be coupled to rotors 110 via a rotor shaft. In such embodiments, the motors 108 may produce power which is transmitted to rotors 110 via the rotor shaft in order to produce thrust for propulsion. The rotor shaft may be made of a metal material (e.g., aluminum, steel, stainless steel, titanium, alloys thereof, etc.), a plastic material (e.g., high-density polyethylene, acrylic, melamine, polycarbonate, etc.), a composite material (e.g., fiberglass, carbon fiber, etc.), and combinations of the foregoing, among others.

The rotors 110 may be made of a composite material, a wood material, a plastic material, a nylon material, a metallic material, or a combination thereof. In various embodiments, rotors 110 may be variable speed, fixed pitch rotors. In other embodiments, rotors 110 may be variable speed, variable pitch rotors. In yet other embodiments, rotors 110 may be fixed speed, variable pitch rotors. Additionally or alternatively, various embodiments may include one or more of the foregoing rotors used in combination with one or more of a different foregoing rotor, or other propulsion systems.

As discussed above, the rotors 110 may be variable pitch rotors. In such embodiments, the rotors 110 may reverse thrust to hover inverted and/or slow down rapidly during horizontal flight. Additionally, the rotors 110 may be set to a high angle of attack to increase flight speed in the horizontal flight configuration.

In the illustrative example, rotors 110 is coupled to motors 108 in a pull configuration. In other embodiments, rotors 110 may be coupled to motors 108 in a push configuration. In yet other embodiments, two rotors 110 may be coupled to each motor 108 in a push-pull configuration.

In various embodiments, the rotors 110 coupled to the motors 108 on the main wing 102 may rotate clockwise, while the rotors 110 coupled to the motors 108 on the vertical wing 104 may rotate counter-clockwise, or vice versa. In other embodiments, the rotors on either end of the main wing 102 may be counter rotating, such that one rotates clockwise and the other rotates counter-clockwise. In such embodiments, the rotors 110 on either end of the vertical wing 104 may also be counter-rotating.

Figure 6:
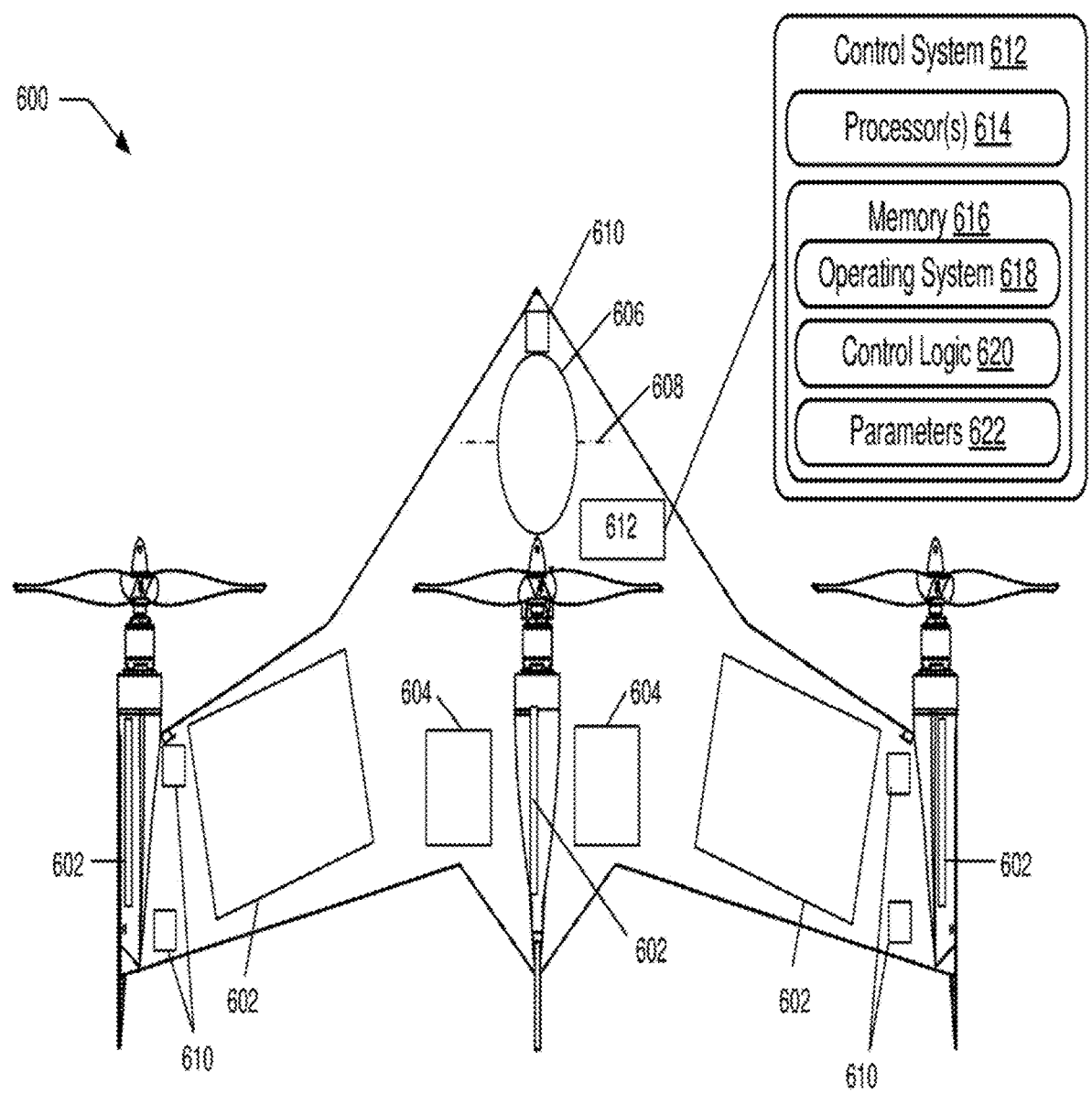
FIG. 6 is a top view of the illustrative High Speed Multi-Rotor VTOL aircraft shown in FIG. 1A, showing various components that may be selectively included in the High Speed Multi-Rotor VTOL aircraft.

FIG. 1A depicts aircraft 100 in the hover mode. In the hover mode, each rotor 110 may spin at substantially the same speed and at substantially the same pitch in order to produce similar lift at each position of the rotors 110. However, each rotor 110 may adjust pitch and/or speed independently of one another, based on signals from a control management system. The control management system, as depicted in FIG. 6, may comprise a computer system capable of receiving and processing signals from an operator (on board operator, remote operator, or both) and a plurality of sensors (e.g., accelerometers, gyroscopes, distance sensors, cameras, etc.). In some embodiments, the control management system may send output signals to each of the rotors 110, directing each of the rotors 110 to increase and/or decrease speed and/or pitch as necessary to maintain the desired flight regime. In some embodiments, the control management system may send output signals to each motor 108, directing the motors to turn on, turn off, idle, fold, feather, increase or decrease power. In some embodiments, the control management system may adjust and/or control the orientation of the VTOL aircraft 100 via the speed and/or pitch of the rotors 110 and/or via adjustments to the control surfaces (i.e., flaps, elevons, etc.).

In various embodiments, the components of the VTOL aircraft 100 may be manufactured via traditional manufacturing techniques. In some embodiments, the components may be manufactured by 3-D manufacturing techniques, injection molding, composite manufacturing, or any other method of manufacturing.

FIG. 1B shows the illustrative VTOL aircraft 100 in a forward flight mode. To transition from the hover mode as depicted in FIG. 1A to the forward flight mode depicted in FIG. 1B, an operator may send a signal and/or provide an input to the control management system indicating the desire to make the transition. In various embodiments, the control management system may then send a signal to the propulsion systems oriented along an axis to increase and/or decrease the speed and/or pitch of the opposing rotors. In the illustrative example, the control management system sends signals to the propulsion systems on the main wing 102 to effect a rotation about a lateral axis 112. In various embodiments, the control management system may also send signals to the control surfaces to aid in and/or effect the rotation about the lateral axis 112.

In some embodiments, the control management system may send signals to increase and/or decrease the rotor speed of the propulsion systems on the vertical wing 104 to affect a rotation about a longitudinal axis. In some embodiments, the transition may be effected by the control management system sending signals to increase and/or decrease the pitch of the rotors along the lateral axis 112 or the longitudinal axis 114. In various embodiments, the control management system may also send signals to the control surfaces to aid in and/or effect the rotation about the lateral axis 112 or the longitudinal axis 114.

While in the forward flight mode depicted in FIG. 1B, the aircraft may rotate about a centerline axis 116 by adjusting the speed and/or the pitch of opposing rotors along an axis. The rotation along the centerline axis 116 may enable the VTOL aircraft 100 to fly with the main wing 102 as the primary lifting surface or with the vertical wing 104 as the primary lifting surface.

Figure 2:
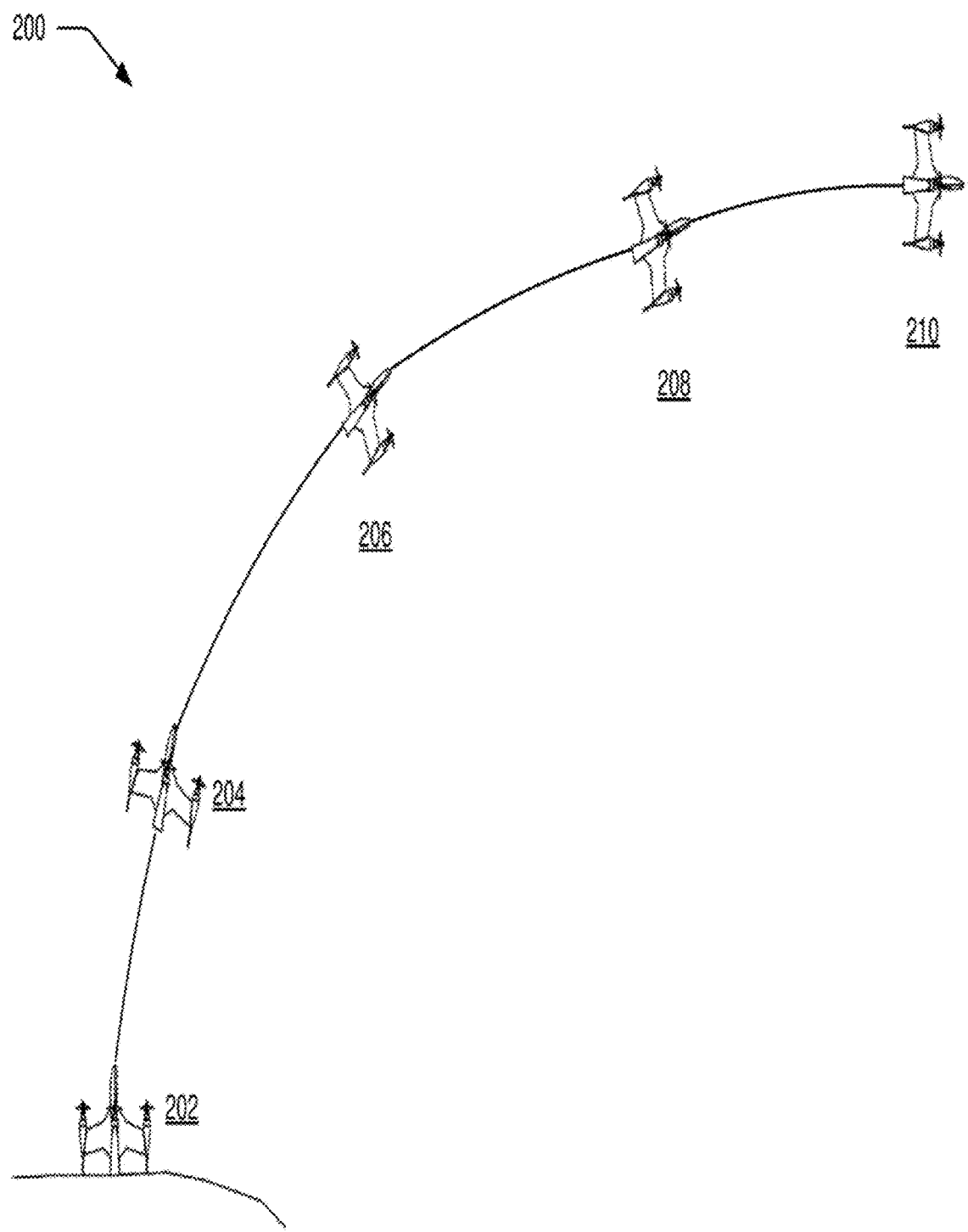
FIG. 2 is a schematic diagram showing a transition of flight of an illustrative High Speed Multi-Rotor VTOL aircraft from takeoff to a transitional mode to a forward flight mode.

FIG. 2 is a schematic diagram showing an illustrative transition of flight of an illustrative VTOL aircraft from takeoff to a transitional mode to a forward flight mode.

At position 202, the VTOL aircraft 100, such as High Speed Multi-Rotor VTOL aircraft, may be in a grounded (i.e., landed) position. In the grounded position, the rotors, such as rotors 110, may be spinning, with engines, such as engines 108, in an idle position. In the grounded position, the rotors may produce little to no thrust. Additionally, in the grounded position, the rotors may produce a downward thrust to keep the VTOL aircraft 100 grounded and/or stable in certain situations, such as in strong or gusting winds.

At position 204, the VTOL aircraft launches, departing from the landing surface and beginning the transition to the horizontal flight configuration. In the illustrative example, the rotors on the main wing may be stationary rotors and the rotors on the vertical wing may be transitioning rotors. In various embodiments, the stationary rotors may increase speed and/or pitch simultaneously at substantially the same rate to produce relatively equal thrust. The relatively equal thrust produced by the stationary rotors may provide a consistent thrust for takeoff, hover, climb, and to establish and maintain forward flight. The stationary rotors may also provide for roll control while in a hover, during the transition, or in forward flight.

Transitioning rotors may adjust speed and/or pitch to effect a transition from a vertical flight regime in which the VTOL aircraft is oriented substantially perpendicular to the horizon to a horizontal flight configuration in which the VTOL aircraft is oriented substantially parallel to the horizon. In some embodiments, the transition may be effected by a pitching motion about the longitudinal axis, such that the main wing becomes the primary lift generating surface in horizontal flight. In some embodiments, the transition may be effected by a rolling motion about the lateral axis, such that the vertical wing becomes the primary lift generating surface in horizontal flight.

In some embodiments, the transition may be effected by increasing the speed and/or pitch of one transitioning rotor. In some embodiments the transition may be effected by increasing the speed and/or pitch of one transitioning rotor, while simultaneously decreasing the speed and/or pitch of the opposite transitioning rotor.

In various embodiments, the VTOL aircraft may takeoff into a hover prior to beginning the transition to the vertical flight configuration. In such embodiments, the transitioning and stationary rotors may spin at substantially the same rate and/or pitch.

At position 206, the VTOL aircraft continues through the transition to the horizontal flight regime. At this position, one transitioning rotor maintains a different rate and/or pitch than the other. As the VTOL aircraft progresses through the transition, the thrust generated by the stationary rotors transitions from a vertical thrust to a horizontal thrust. At position 206, the vectors of vertical and horizontal thrust generated by the stationary rotors may be substantially equal.

At position 208, the VTOL aircraft is close to completing the transition to the horizontal flight configuration. In various embodiments, the transitioning rotors may be set to relatively equivalent speeds and/or pitches, allowing the momentum to carry the VTOL aircraft through last few degrees of transition. In some embodiments, the transitioning rotors may make adjustments to increase and/or decrease speed and/or pitch to effectively stop the pitching or rolling motion, and establish the VTOL aircraft in the horizontal flight configuration.

At position 210, the VTOL aircraft has completed the transition to the horizontal flight configuration. At this position, the transitioning and stationary rotors may be set to substantially equivalent speed and/or pitch to maintain constant thrust in a direction substantially parallel to the horizon.

Figure 3A:
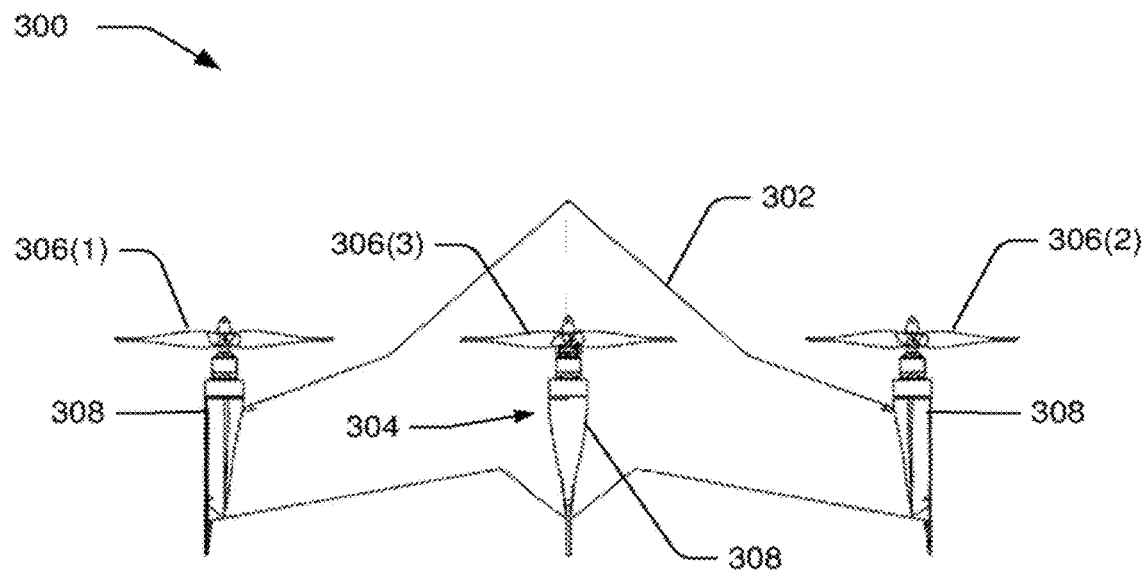
FIGS. 3A and 3B are side elevation views of an illustrative High Speed Multi-Rotor VTOL aircraft in forward flight mode.
Figure 3B:
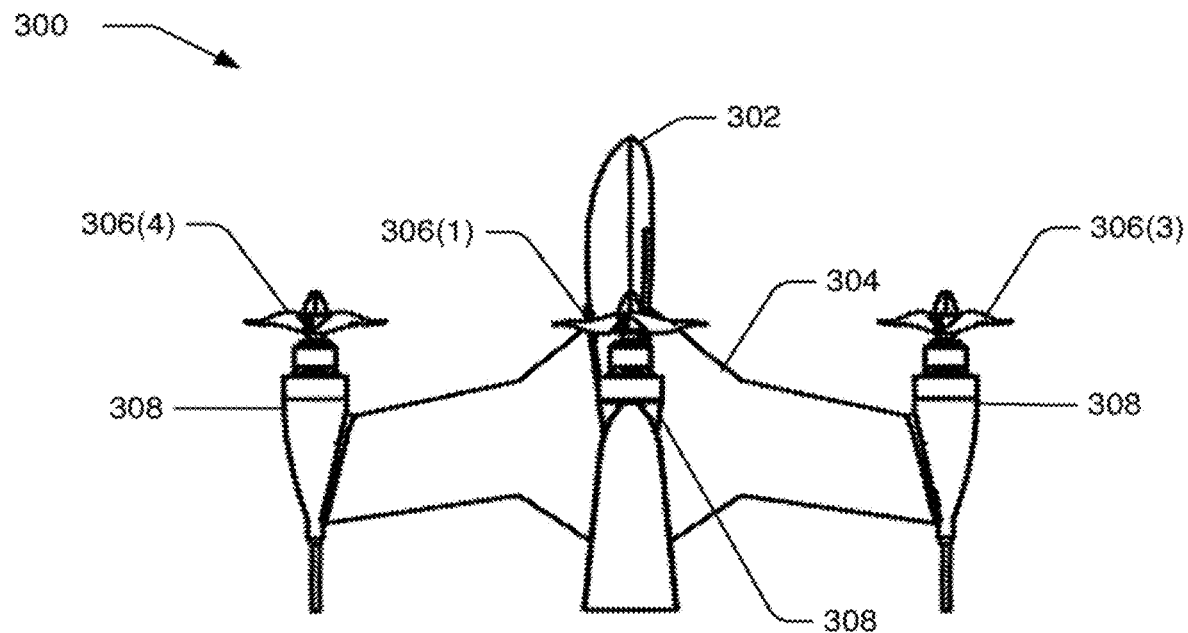

FIGS. 3A and 3B are side elevation views of an illustrative High Speed Multi-Rotor VTOL aircraft in forward flight mode. FIG. 3A shows the VTOL aircraft with main wing loading. FIG. 3B shows the VTOL aircraft with vertical wing loading.

VTOL aircraft 300, like VTOL aircraft 100, comprises a main wing 302 and a vertical wing 304. The main wing 302 may have a larger, smaller, or identical wingspan as compared to the vertical wing 304. In some embodiments, the main wing 302 and the vertical wing 304 may have identical symmetry and/or camber. In various embodiments, the main wing 302 and the vertical wing 304 may have different symmetry. For example, the main wing 302 may be a delta wing design, and the vertical wing 304 may be a high aspect ratio design.

In the illustrative example, main wing 302 and vertical wing 304 have thrust-producing rotors 306, such as rotor 106, mounted to the main wing 302 and the vertical wing 304. As shown in FIG. 3, the rotors are pull-type rotors mounted to the leading edge of the wings. In some embodiments, the rotors 306 may be push-type rotors mounted to the trailing edge of the wings. In some embodiments, rotors 306 may be mounted to the leading edge and the trailing edge of the wings in a push-pull type configuration.

In the illustrative example, rotors 306 are mounted to the ends of each wing. However, the rotors 306 may be mounted at any position along the wing. In some embodiments, opposing rotors 306 on the same wing, such as rotors 306(1) and 306(2), may be mounted equidistant from a centerline axis. In some embodiments, all rotors 306 may be mounted the same distance from the centerline axis.

In the illustrative example, each rotor 306 is coupled to a motor 308. As shown in FIGS. 3A and 3B, the motor(s) 308 are coupled directly to the rotor(s) 306, at the end of each wing. However, it is imagined that the rotor(s) 306 may be coupled to one or more motors located in a separate position. For example, one or more motor(s) 308 may be located inside the skin of the VTOL aircraft. In such an example, one motor 308 may drive one or more rotor(s) 306.

In some embodiments, motor 308 may be an electric motor. In some embodiments, motor 308 may be a combustion engine or a hybrid engine. For example, motor 308 may be a jet engine, which may produce thrust. In such an example, the jet engine may replace the rotor 306.

FIG. 3A depicts the VTOL aircraft 300 in the horizontal flight configuration, with the main wing 302 acting as the primary lift-generating source. In the horizontal flight configuration, rotors 306 driven by motors 308 may produce thrust in a direction substantially parallel to the horizon. In some embodiments, adjustments to the speed and/or pitch of each rotor may provide for pitch, roll, and yaw control of the aircraft. For example, yaw control may be effected by adjusting the thrust of rotors 306(1) and/or 306(2). In some embodiments, VTOL aircraft 300 may comprise flight control surfaces (e.g., ailerons, elevons, flaperons, rudders, etc.) to assist in the pitch, roll, and/or yaw control of the aircraft.

In various embodiments, the VTOL aircraft 300 may transition from main wing loading orientation shown in FIG. 3A to vertical wing loading orientation shown in FIG. 3B. In some embodiments, the VTOL aircraft may transition by adjusting the speed and/or pitch of two or more rotors to effect a rolling motion about the centerline axis. In various embodiments, the VTOL aircraft may transition by adjusting the control surfaces. In some embodiments, the VTOL aircraft may transition by adjusting the speed and/or pitch of two or more rotors and by adjusting the control surfaces. The roll may be a 90 degrees roll clockwise or counter-clockwise. In some embodiments, flight control surfaces, such as ailerons may assist in the rolling motion to establish the aircraft in a vertical wing loading orientation. The vertical wing loading orientation may allow VTOL aircraft 300 to achieve higher speeds than the main wing loading orientation, due at least in part to reduced induced drag.

Figure 4:
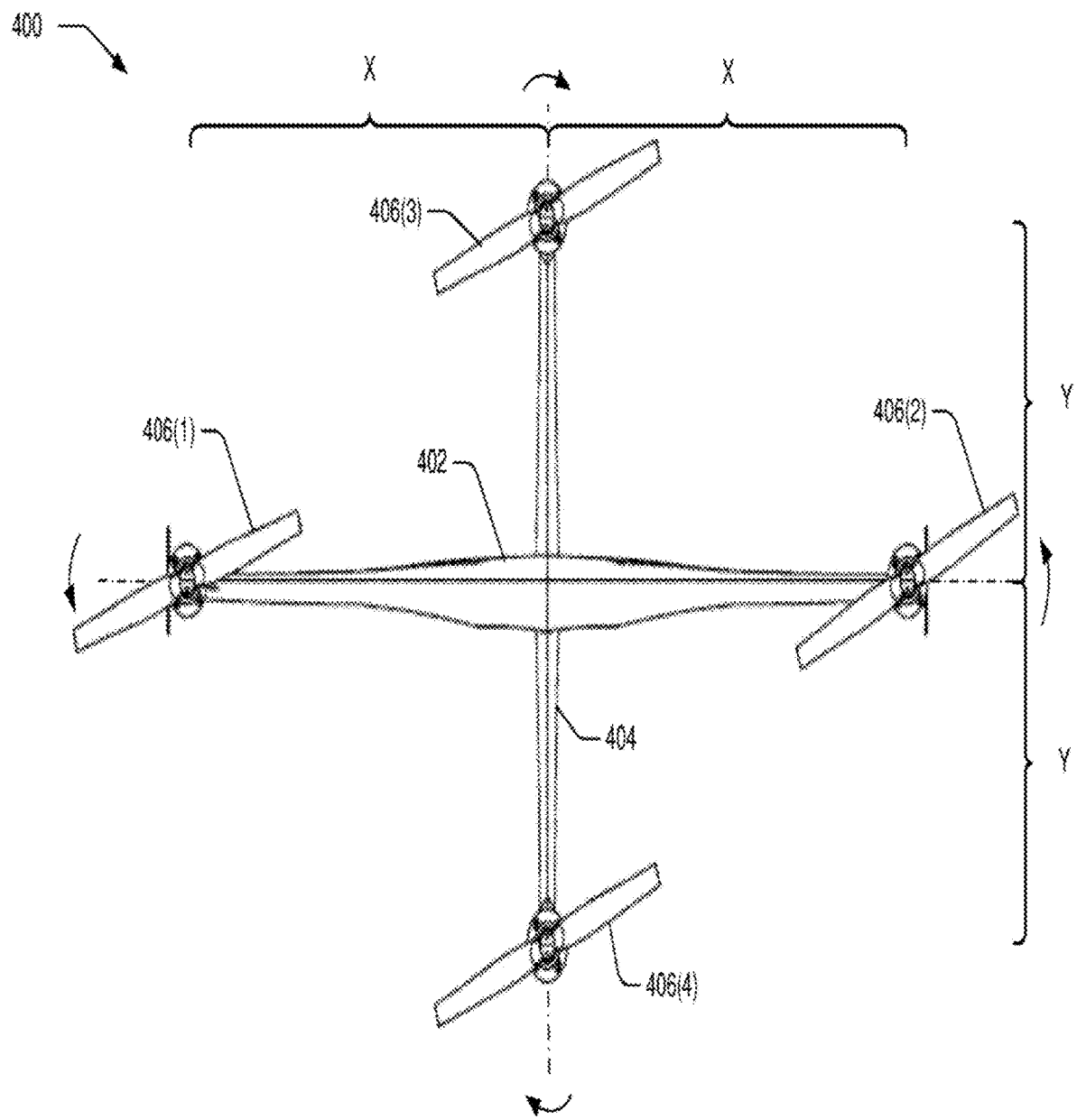
FIG. 4 is a top view of the illustrative High Speed Multi-Rotor VTOL aircraft shown in FIG. 1A.

FIG. 4 is a top view of the illustrative High Speed Multi-Rotor VTOL aircraft shown in FIG. 1A. As depicted, the VTOL aircraft is in a vertical flight configuration.

The VTOL aircraft 400, such as VTOL aircraft 100, may comprise a main wing 402 and a vertical wing 404. In the illustrative example, the main wing 402 may have a longer wingspan and a larger root than vertical wing 404. In other examples, the main wing 402 may have the same wingspan and/or root as the vertical wing 404.

VTOL aircraft 400 may have a plurality of rotors 406 coupled to and driven by at least one motor, such as motor 108. The rotors 406 may be variable speed and/or variable pitch rotors. In the illustrative example, rotors 406(1), 406 (2), 406(3) and 406(4) are the same size and shape. In some embodiments, rotors 406(1) and 406(2) may be of a different wingspan and/or shape than rotors 406(3) and 406(4).

As illustrated in FIG. 4, rotors 406(1) and 406(2) are mounted on the main wing, and rotors 406(3) and 406(4) are mounted on the vertical wing. In various embodiments, rotors 406(1) and 406(2) may be mounted a distance X from the centerline axis, while rotors 406(3) and 406(4) may be mounted a distance Y from the centerline axis, where X>Y. In some embodiments, X=Y, such that each of the rotors 406 is mounted equidistant from the centerline axis. In various embodiments, it may be beneficial to mount each of the rotors 406 equidistant from the centerline axis. However, in other embodiments, it may be beneficial to mount the rotors 406 on opposing wings at different distances from the centerline axis.

In the illustrative example, the rotors 406(1) and 406(2) rotate counterclockwise, while the rotors 406(3) and 406(4) rotate clockwise. In other examples, the rotors 406(1) and 406(2) may rotate clockwise, and the rotors 406(3) and 406(4) may rotate counterclockwise. In still yet other examples, the rotors 406(1) and 406(2) may counter-rotate, such that one rotates clockwise and the other rotates counterclockwise, or vice versa. In such examples, the rotors 406(3) and 406(4) may also counter-rotate. In various embodiments, two rotors 406 may counter-rotate, and two rotors 406 may rotate in the same direction.

Figure 5:
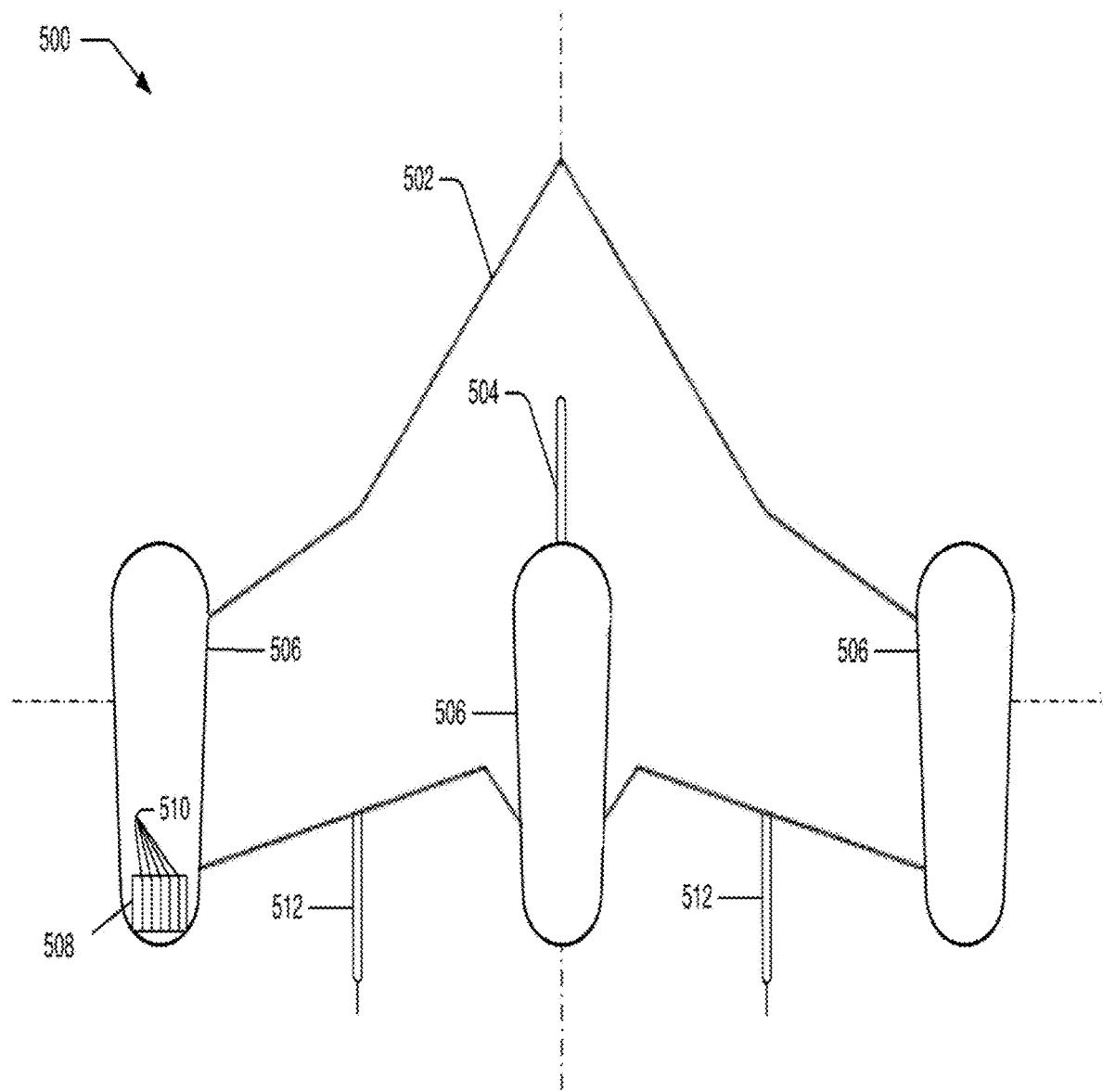
FIG. 5 is a top view of an illustrative High Speed VTOL aircraft with an illustrative propulsion system.

FIG. 5 is a top view of the illustrative High Speed Multi-Rotor VTOL aircraft in a horizontal flight configuration, with jet engines as the propulsion system. As depicted, the VTOL aircraft is in a horizontal flight configuration.

VTOL aircraft 500 may include a main wing 502 and a vertical wing 504. In some embodiments, the vertical wing 504 may be offset 90 degrees from the main wing 502. In some embodiments, the vertical wing 504 may be offset at an angle less than 90 degrees from the main wing 502. In such examples, the offset angle may be between 80-90 degrees, between 60-80 degrees, or between 45-60 degrees.

The VTOL aircraft 500 may include a propulsion system. In the illustrative example, the propulsion system comprises four jet engines 506. In other examples, the propulsion system may comprise one or more rotor systems coupled to and driven by an electric motor, a turbo propeller engine, a hybrid engine, or the like. Each jet engine 506 may generate thrust independently or in conjunction with one or more other jet engine 506.

In various embodiments, VTOL aircraft 500 may takeoff into a vertical flight configuration by increasing the thrust generated by one or more of the jet engines 506. VTOL aircraft 500 may transition from the vertical flight configuration to the horizontal flight configuration depicted in FIG. 5 by varying the thrust generated by one or more jet engines 506. For example, the vertical wing of VTOL aircraft 500 may have a first and a second jet engine mounted at opposite ends. The VTOL aircraft 500 may transition by increasing the thrust generated by the first jet engine, while maintaining a constant thrust with the second jet engine. The VTOL aircraft 500 may transition by increasing the thrust generated by the first jet engine and decreasing the thrust generated by the second jet engine. In some embodiments, the VTOL aircraft 500 may transition by maintaining a constant thrust from the first jet engine, and decreasing the thrust generated by second jet engine. Additionally, the transition may facilitated by increasing and/or decreasing the thrust generated by a third and a fourth jet engine, the third and fourth jet engines being mounted on a different wing than the first and second jet engines (i.e., if the first and second jet engines may be mounted on the vertical wing, the third and fourth jet engines may be mounted on the main wing, or vice versa).

In various embodiments, jet engine 506 may comprise a thrust vectoring system 508. In some embodiments, the thrust vectoring system 508 may be mounted in the exhaust of the jet engine 506. In some embodiments, the thrust vectoring system 508 may be mounted outside the jet engine 506. In various embodiments, the thrust vectoring system 508 may direct the flow of the exhaust generated by jet engine 506, thereby adjusting the thrust vector. The thrust vectoring system 508 may provide increased stability and maneuvering while in the vertical and horizontal flight configurations.

In the illustrative example, thrust vectoring system 508 may include multiple vanes 510, each of the vanes being adjustable together to direct the exhaust in a particular direction. In some embodiments, the thrust vectoring system 508 may comprise an adjustable nozzle which can direct the exhaust. In some embodiments the adjustable nozzle may be mounted on a gimbal in the exhaust.

The VTOL aircraft 500 may include landing gear 512 that is fixed or retractable. In the illustrative example, the landing gear 512 is rigid-type landing gear. In various embodiments, the landing gear 512 may comprise a tire and/or a strut system.

FIG. 6 is a top view of the illustrative High Speed Multi-Rotor VTOL aircraft shown in FIG. 1A, showing various components that may be selectively included in the High Speed Multi-Rotor VTOL aircraft.

VTOL aircraft 600, similar to VTOL aircraft 100, may comprise a main wing and a vertical wing, with rotor systems mounted at the end of each of the main wing and the vertical wing. The rotor systems may be coupled to and driven by one or more motors powered by electricity.

In various embodiments, VTOL aircraft 600 may comprise solar panels 602 to provide electricity to power the motors. In such embodiments, the solar panels may be incorporated into the skin of the VTOL aircraft 600 (i.e., glued or painted on, manufactured with the skin), and/or mounted on the aircraft. In some embodiments, VTOL aircraft 600 may comprise an alternator, a wind turbine generator, or any other method for generating electricity. In such embodiments, VTOL aircraft 600 may comprise a turbine configured to spin in the ram air to generate electricity. In some embodiments, the VTOL aircraft 600 may utilize a disengaged spinning rotor to generate electricity. The electricity to power the motors may be stored in one or more batteries 604 inside VTOL aircraft 600. The batteries 604 may be nickel-cadmium, lead-acid, zinc-bromine, lithium-ion, nickel hydrogen, or any other type of rechargeable battery.

In various embodiments, VTOL aircraft 600 may comprise a cockpit 606. In some embodiments, cockpit 606 may include space for one or more passengers and/or other payload. The cockpit 606 may be made of a metal material, a plastic material, a glass material, or a combination thereof. The cockpit 606 may include a canopy that provides a weatherproof and relatively quiet environment. The canopy may be formed of acrylic, plastic, glass, or any other transparent material.

In various embodiments, the cockpit 606 may be mounted in a rotating assembly, thereby allowing the cockpit 606 to rotate about a cockpit axis 608 in a transition from the vertical flight configuration to the horizontal flight configuration. In some embodiments, the rotating assembly may allow cockpit 606 to rotate about the cockpit axis 608 and about a second axis to maintain an upright position of the cockpit 606 upon transition from main wing loading horizontal flight configuration to a vertical wing loading horizontal flight configuration.

In some embodiments, the cockpit 606 may be mounted on a gimbaled chassis and/or a pivoting chassis. Each of the rotating assembly, gimbaled chassis, and pivoting chassis may allow freedom of movement between a first position in the vertical flight configuration and a second position in the horizontal flight configuration. The first position may be 90 degrees offset from the second position. In some embodiments, the first position may allow the one or more passengers to sit upright in the VTOL aircraft during the vertical flight configuration. In some embodiments, the second position may allow the one or more passengers to sit upright in the VTOL aircraft during the horizontal flight configuration.

In various embodiments, the VTOL aircraft 600 may include one or more stability augmentation sensors 610 that monitor a position, angle, acceleration, and/or orientation of a portion of the VTOL aircraft. For example, the stability augmentation sensors 610 may comprise gyroscopes and/or accelerometers that monitor the pitch, roll, and yaw of the VTOL aircraft 600, and changes of each over time. The stability augmentation sensors 610 may provide input via signals to a control management system 612.

The control management system 612 may comprise a computer system with one or more processor(s) 614, one or more memories 616, an operating system 618, control logic 620, and/or one or more parameters 622. The control management system 612 may process the signals from the stability augmentation sensors 610, input from an operator (pilot) via operator controls, and/or input stored in the one or more memories 616 to determine how to direct and power the rotors to maintain flight in the vertical flight mode, the transition mode 204-206, and the forward-flight mode 210.

For example, the stability augmentation sensors 610 may detect a sudden tilt of the aircraft due to a gust of wind or other force exerted on the VTOL aircraft 600. In response, the stability augmentation sensors 610 may transmit a signal to the control management system 612. The control management system 612 may cause an increase or decrease in thrust generated by one or more rotors to cancel the exerted force, and thus stabilize flight of the VTOL aircraft 600. Meanwhile, the control management system 612 may also process commands from the operator. The control management system 612 may prioritize control input from the stability augmentation sensors 610 and the operator to maintain stable flight. For example, when an operator provides a command that may compromise sustained flight, the control management system 612 may ignore the command and/or only execute the command for a limited duration before issuing another command (possibly in response to a signal from the stability augmentation sensors 610) to take action to sustain flight.

The operator, using flight controls, sends input signals to the control management system 612. In turn, the control management system 612 receives the signals from the flight controls and/or the stability augmentation sensors 610. The control management system 612 prioritizes the inputs from the stability augmentation sensors 610 and inputs from the operator and then adjusts a thrust and/or direction/orientation of the thrust generated by each rotor.

The control management system 612 may adjust the orientation and/or control of the VTOL aircraft 600 semi-autonomously and/or fully autonomously. In semi-autonomous flight, operation of the aircraft may be performed by providing simple directional commands from operator controls to the control management system 612, as well as input from the stability augmentation sensors 610. In the semi-autonomous mode, the inputs may mixed, and the control management system 612 may apply the proper signals to the rotors and/or control surfaces to effect the desired flight configuration and/or orientation.

In fully autonomous flight, the VTOL aircraft 600 may have a flight plan loaded into the control management system, the flight plan directing the configuration and/or navigation of the VTOL aircraft 600. Additionally, the VTOL aircraft 600 may be capable of fully autonomous flight in an emergency situation. For example, if an operator becomes incapacitated, the VTOL aircraft 600 may be configured for an automatic recovery function in which the aircraft may establish a hover and land in the vertical flight configuration without input from an operator. For another example, the VTOL aircraft 600 may enable the automatic recovery function upon lost contact with a remote operator.

Figure 7:
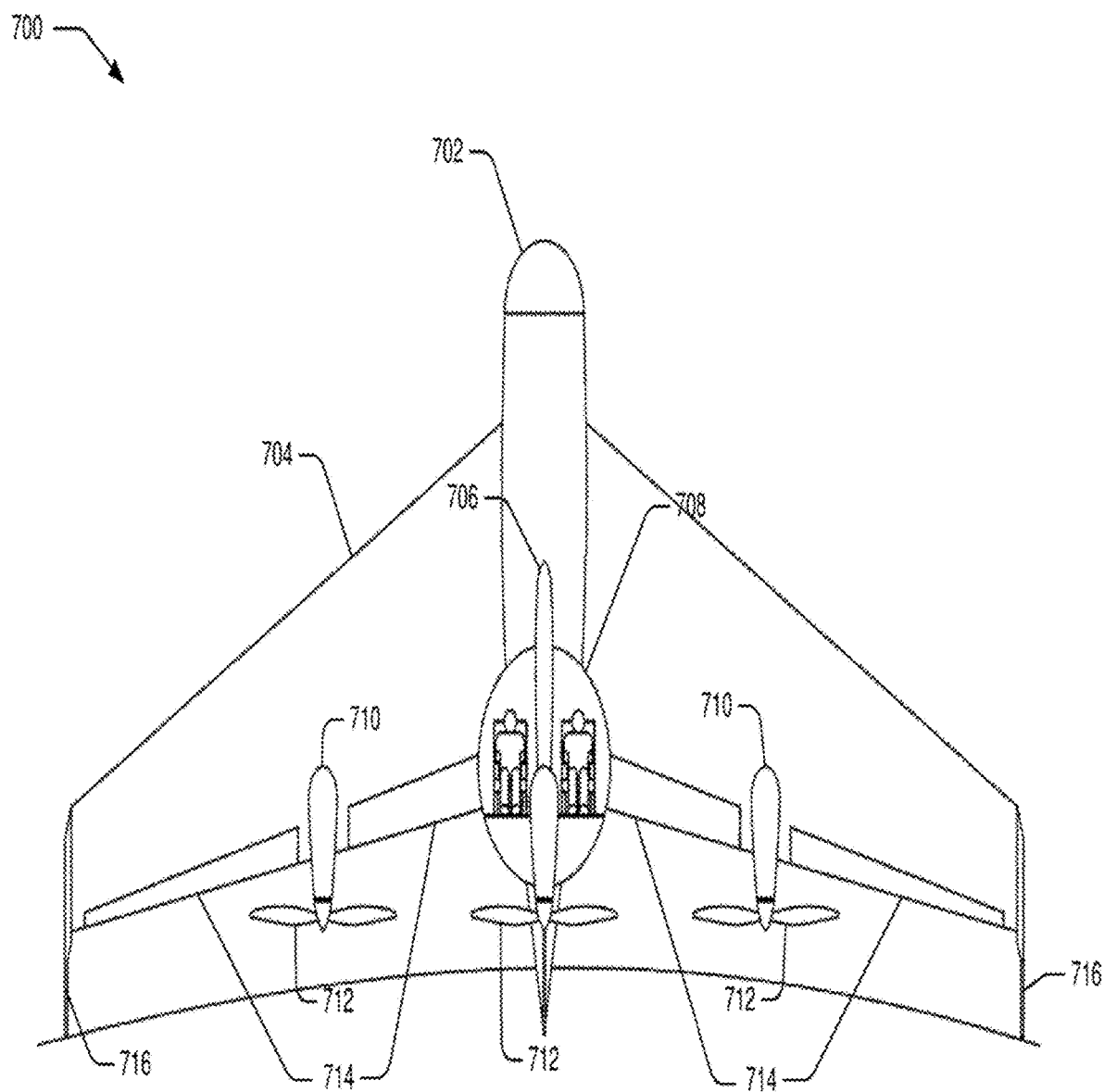
FIG. 7 is a side view of an illustrative manned High Speed Multi-Rotor VTOL aircraft with pusher-type rotors.

FIG. 7 is a side view of an illustrative manned High Speed Multi-Rotor VTOL aircraft with pusher-type rotors. FIG. 7 depicts the VTOL aircraft in a landed position.

VTOL aircraft 700 may comprise a monocoque structure, made of carbon fiber and/or other composite material, titanium, aluminum, or any other material appropriate for aircraft construction. In another embodiment, the structure may comprise a semi-monocoque design, with a shell and longerons made of carbon fiber, titanium, aluminum, or any other material appropriate for aircraft construction. The aircraft skin is a low friction surface that may include built-in solar cells.

In various embodiments, VTOL aircraft 700 may comprise a fuselage 702, a main wing 704, and a vertical wing 706. The fuselage 702 may include a cockpit 708 configured to hold one or more passengers and/or other payload. In some embodiments, the cockpit 708 may be mounted on a rotating assembly, a gimbaled and/or a pivoting chassis, thereby allowing movement about its own axis. In the illustrative example, the passengers in the cockpit 708 are seated in a first position, the first position being substantially upright while the aircraft is in the landed position. The cockpit 708 may remain this position while in the vertical flight configuration. However, when the VTOL aircraft 700 transitions to forward flight, such as through positions 204-210, the cockpit may rotate about its axis to a second position, wherein the first and the second positions are substantially similar in that the passengers remain in the substantially upright position in the horizontal flight configuration.

In some embodiments, the cockpit 708 may be mounted in the fuselage 702. In some embodiments, the cockpit 708 may be mounted in the main wing 704 and/or vertical wing 706.

In various embodiments, motors 710 may be mounted in the main wing 704 and the vertical wing 706. In the illustrative example, motors 710 are each mounted equidistant from a centerline axis. The motors 710 may be electrically driven, gas driven, or a hybrid of electric and gas.

The motors 712 may be coupled to and may drive rotors 712. In the illustrative example, rotors 712 are push-type rotors. In other examples, the rotors 712 may be pull-type rotors.

VTOL aircraft 700 may include flight control surfaces 714, such as ailerons, flaperons, elevons, rudders, etc. The flight control surfaces 714 may facilitate pitch, roll, and/or yaw control of the aircraft.

VTOL aircraft 700 may also include landing gear 716. The landing gear 716 may be fixed or retractable. As illustrated in FIG. 7, the landing gear 716 may be a rigid pole-type landing system. In various embodiments, the pole-type landing system may be telescopic, thereby allowing it to retract. In some embodiments, the rigid pole-type landing system may include a skid as a landing surface. In some embodiments, the landing gear 716 may comprise a strut and tire system.

In various embodiments with retractable landing gear, the landing gear 716 may comprise a backup system to deploy the gear in an emergency situation. For example, if power is lost to the landing gear system, a hydraulic system may provide the force enough to deploy the landing gear 716. In some embodiments, the VTOL aircraft 700 may comprise an emergency parachute system, deploying a parachute to allow for recovery of the aircraft in an emergency, such as a total power loss. In such embodiments, the emergency parachute system may work in conjunction with the landing gear, thereby providing a stable landing platform after a descent controlled by the parachute.

Figure 8A:
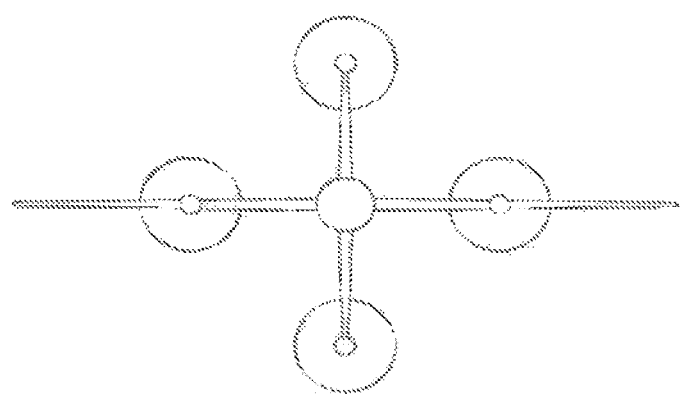
FIG. 8A depicts the VTOL aircraft in the vertical flight configuration.
Figure 8B:
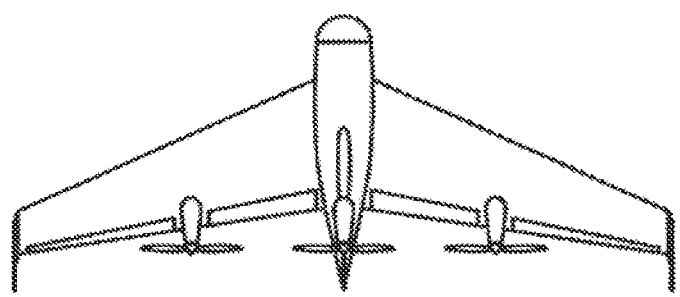
FIG. 8B depicts the VTOL aircraft in the horizontal flight configuration with main wing-loading.
Figure 8C:
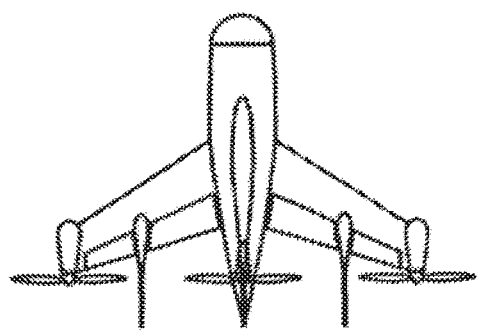
FIG. 8C depicts the VTOL aircraft in the horizontal flight configuration with vertical wing-loading.

FIG. 8 depicts the unmanned version of the illustrative High Speed Multi-Rotor VTOL aircraft shown in FIG. 7 while in the vertical and horizontal flight configurations. FIG. 8A is a vertical view of the VTOL aircraft in the vertical flight configuration. FIG. 8B is a vertical view of the VTOL aircraft in the horizontal flight configuration with main wing-loading. FIG. 8C is a vertical view of the VTOL aircraft in the horizontal flight configuration with vertical wing-loading.

As previously discussed, VTOL aircraft 800 may comprise a main wing, and a vertical wing. A propulsion system of VTOL aircraft 800 may comprise four rotors, such as rotors 712, coupled to and driven by four motors, such as motor 710. As illustrated in FIGS. 8A-8C, two of the motors are mounted on the main wing and two of the motors are mounted on the vertical wing.

In the illustrative example, each of the rotors are mounted equidistant from a centerline axis. In other examples, the rotors on the main wing may be mounted a different distance from the centerline axis than the rotors on the main wing, such as shown in FIG. 4. The rotors may be push or pull type rotors. The rotors may be variable speed and/or variable pitch rotors.

FIG. 8A is a vertical view of the VTOL aircraft 800 in the vertical flight configuration. In the vertical flight configuration, each of the rotors may produce substantially the same thrust, so as to lift the VTOL aircraft 800 in a direction perpendicular to the horizon. However, each of the motors and rotors may act independently of the others.

A flight control management system may receive signals from the plurality of stability augmentation sensors, and may adjust the thrust produced by each rotor in order to maintain stability. In various embodiments, the flight control management system may also receive signals from an operator, such as a signal to transition from the vertical flight configuration to the horizontal flight configuration depicted in FIGS. 8B and 8C.

VTOL aircraft 800 may in the horizontal flight configuration with main wing loading and/or vertical wing loading. FIG. 8B shows the VTOL aircraft 800 with main wing loading, while FIG. 8C shows the VTOL aircraft 800 with vertical wing loading. The VTOL aircraft may transition between main wing and vertical wing loading, by rotating the aircraft 90 degrees about the centerline axis. The vertical wing loading may allow for higher velocities.

Figure 9:
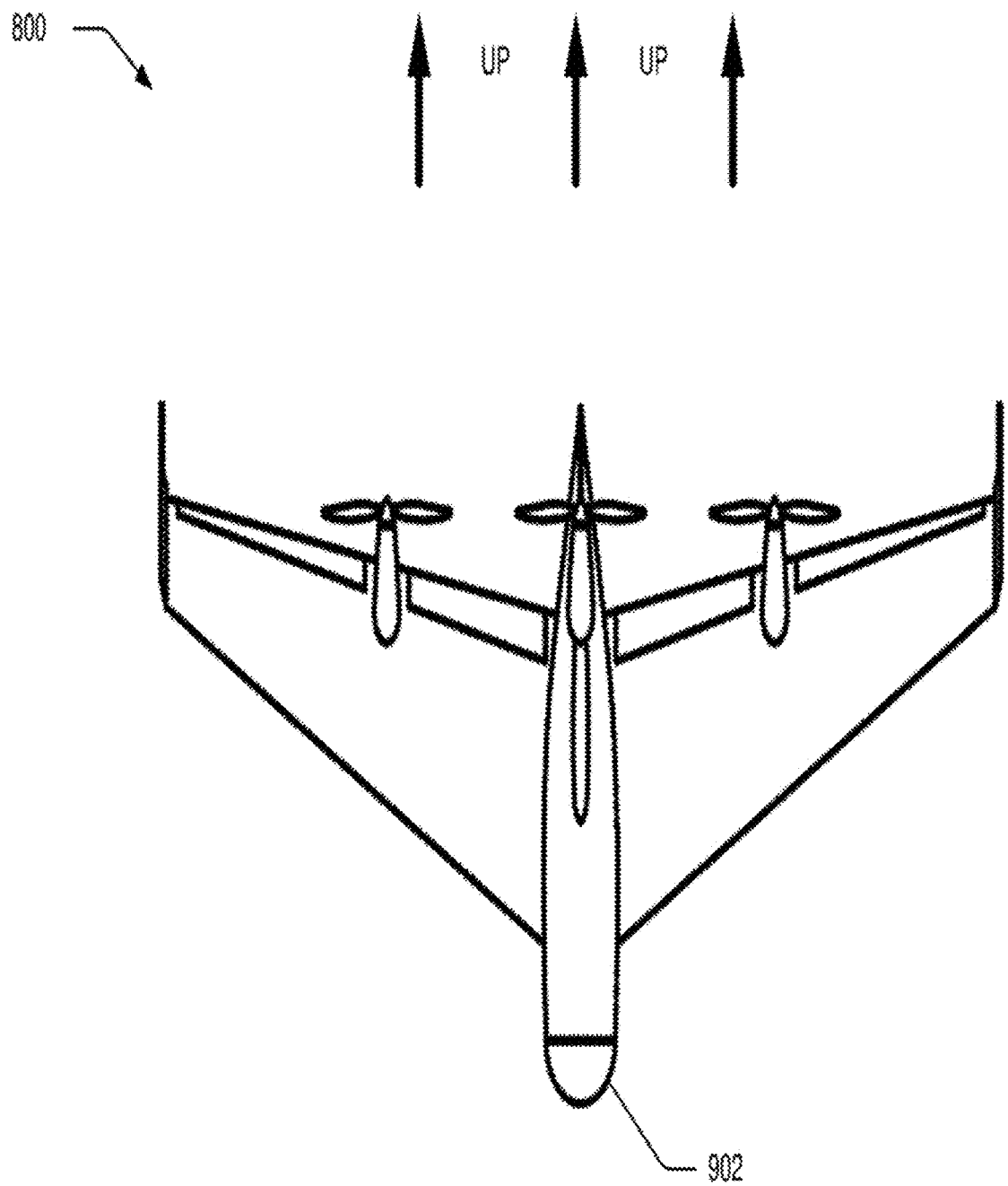
FIG. 9 is a side view of the illustrative High Speed Multi-Rotor VTOL aircraft shown in FIG. 8 in the vertical flight configuration.

FIG. 9 is a side view of the illustrative High Speed Multi-Rotor VTOL aircraft shown in FIG. 8 in the vertical flight configuration. FIG. 9 depicts the VTOL aircraft hovering in a nose-down configuration.

In the horizontal flight configuration, VTOL aircraft 800 may rotate about the lateral and/or longitudinal axes 180 degrees to effect a nose-down hover. In various embodiments, the rotors may adjust pitch to switch from a push-type rotor to a pull-type rotor.

VTOL aircraft 800 may include storage pod 902, such as storage pod 106, at the nose of the aircraft. In such embodiments, the storage pod 902 may be used to house cameras, communication equipment, collision avoidance systems, electronically stabilized platforms, or any other reasonable payload. In various embodiments, storage pod 902 may be encapsulated by a canopy. In such embodiments, the canopy may be made of a plastic material, a glass material, or any other transparent material capable of withstanding a potential impact. The canopy may provide a weatherproof environment to protect the equipment in the storage pod 902. In some embodiments, the storage pod 902 may be encapsulated by the same material as the aircraft skin. In such embodiments, the storage pod 902 may include one or more windows.

Figure 10:
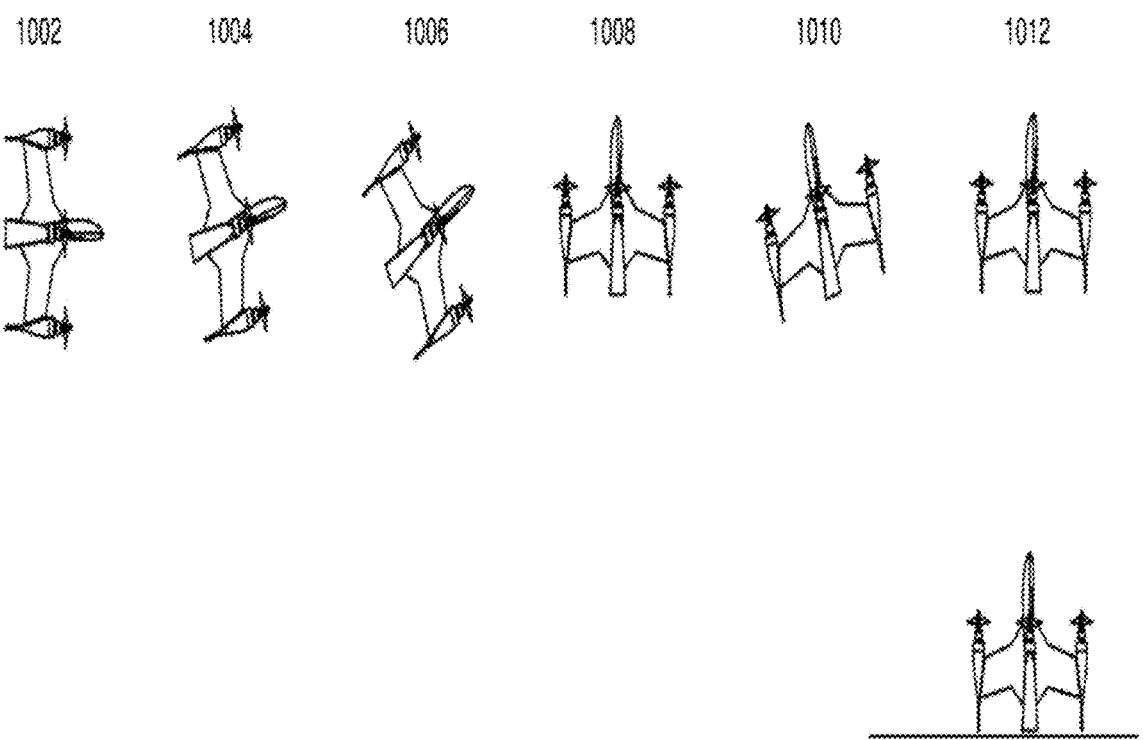
FIG. 10 is a schematic diagram showing a transition of flight of an illustrative High Speed Multi-Rotor VTOL aircraft from the horizontal flight mode to a transition mode to landing.

FIG. 10 is a schematic diagram showing a transition of flight of the illustrative High Speed Multi-Rotor VTOL aircraft shown in FIG. 1 from the horizontal flight mode to a transitional mode to landing.

At position 1002, the VTOL aircraft 100 is established in the horizontal flight configuration. In the horizontal flight configuration, each of the rotors may produce substantially equivalent thrust. The VTOL aircraft 100 may fly with main wing loading or vertical wing loading, and may transition between the two while in flight. As depicted, the VTOL aircraft 100 is in the horizontal flight configuration with vertical wing loading. Thus, the rotors on the main wing are the transitioning rotors and the rotors on the vertical wing are the stationary rotors. However, the VTOL aircraft is not limited to this configuration, and the transition to land may be made from the main wing loading configuration. From the main wing loading configuration, the rotors on the vertical wing are the transitioning rotors and the rotors on the main wing are the stationary rotors.

At position 1004, the VTOL aircraft adjusts speed and/or pitch of the transitioning rotors. In various embodiments, one transitioning rotor may increase thrust while the opposing transitioning rotor may decrease thrust to effect a rotation about a lateral or longitudinal axis. In some embodiments, one of the transitioning rotors may increase or decrease thrust to effect the rotation about the lateral or longitudinal axes.

The stationary rotors may maintain, increase, or decrease thrust as necessary to maintain the desired flight path. Each of the stationary rotors may generate substantially the same amount of thrust, thereby maintaining a stable heading.

At position 1006, the VTOL aircraft continues through the transition mode, with the horizontal and vertical thrust vectors produced by the stationary rotors being substantially equivalent. In this position, if a transition to a high hover is desired, the stationary rotors may increase thrust to maintain altitude. However, the VTOL aircraft is not limited to a high hover. In some embodiments, the VTOL aircraft may transition to land on a glideslope, such as in a no-hover landing.

At position 1008, the VTOL aircraft is in a vertical configuration. The VTOL aircraft may stabilize in this position, or the horizontal momentum may carry the aircraft through position 1008 to position 1010 before stabilizing back in the vertical configuration at position 1012. In some embodiments, the VTOL aircraft may be positioned to cancel out the horizontal momentum, such as in position 1010, using reverse thrust to decelerate down to, but not past, zero horizontal speed.

The VTOL aircraft fly vertically from position 1012 to a landing at position 1014. While flying vertically, each of the rotors may produce substantially the same thrust. The control management system may adjust the thrust produced by each of the rotors independently to maintain stability in vertical flight. In various embodiments, the landing may be flown by the control management system and/or an operator. From position 1012 to position 1014, the thrust produced by the rotors may decrease to an idle position at position 1014, in which the rotors produce little to no thrust. At position 1014, the VTOL aircraft 100 rests on landing gear, such as landing gear 512.

FIGS. 11A-11C are various views of an illustrative foldable rotor. FIG. 11A is a perspective view of an illustrative High Speed Multi-Rotor VTOL aircraft in forward flight, with two rotors folded and two rotors extended. FIG. 11B is perspective view of the foldable rotor in the extended position. FIG. 11C is a perspective view of a foldable rotor in a folded position.

While in the horizontal flight configuration, VTOL aircraft 1100 may disengage one or more rotors. Various embodiments contemplate that this may help to save electricity and/or fuel. In the illustrative example, the engaged rotors 1102 may continue to spin, thereby producing thrust for VTOL aircraft 1100, and the disengaged rotors 1104 may fold backward toward an aft end of the aircraft. In such examples, the control management system may adjust control surfaces in order to control the VTOL aircraft 1100. In some embodiments, the disengaged rotors 1104 may be locked in the folded position. In some embodiments, the disengaged rotors 1104 may be free to spin in the folded position.

As shown in FIG. 11A, VTOL aircraft 1100 may have two rotors disengaged, and two rotors engaged. However, other combinations of engaged and disengaged rotors are imagined. For example, VTOL aircraft 1100 may have one rotor disengaged and the remaining rotors engaged. For another example, VTOL aircraft 1100 may have one rotor engaged, and the remaining rotors disengaged.

In various embodiments, the one or more disengaged rotors may be free to spin in a feathered position. In the feathered position, the disengaged rotors may produce minimal amount of drag. In some embodiments, the rotors may produce electricity to charge one or more batteries when they spin in the feathered position.

As depicted in FIG. 11A, the VTOL aircraft 1100 is flying in a main wing loading horizontal flight configuration. As such, the engaged rotors 1102 are the rotors mounted on the main wing, and the disengaged rotors 1104 are the rotors mounted on the vertical wing. However, the VTOL aircraft 1100 may fly in the vertical wing loading horizontal flight configuration, with the rotors on the vertical wing engaged and the rotors on the main wing disengaged.

VTOL aircraft 1100 may fold and unfold the rotors while in flight, in the horizontal flight configuration. FIG. 11B shows a rotor, such as 1102 and 1104, in the unfolded position. FIG. 11C shows a rotor, such as 1102 and 1104, in the folded position. The rotor system may include a locking mechanism (i.e., a locking pin) which may secure rotor 1104 in the folded position depicted in FIG. 11C. The rotor system may also include an emergency system to destroy the locking mechanism in case of an emergency. The emergency system may include a shearing system, a localized explosive charge, etc.

Figure 12A:
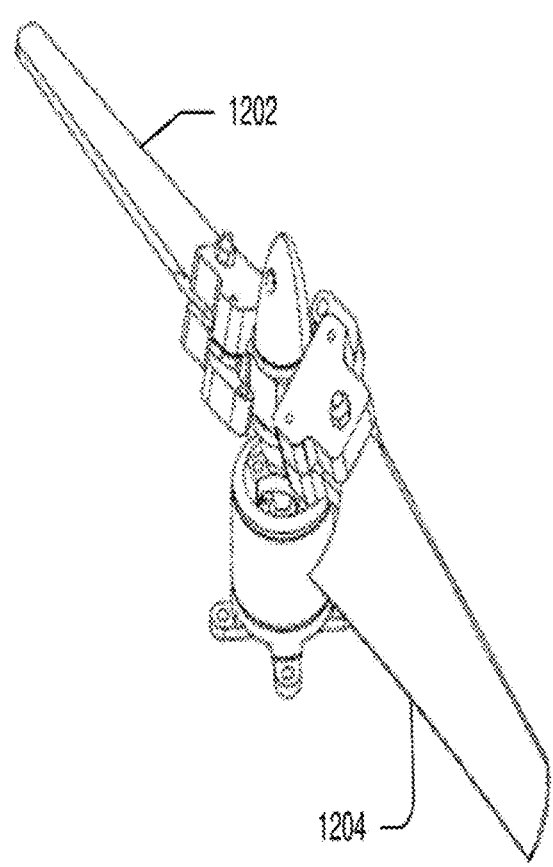
FIGS. 12A and 12B are perspective views of a variable pitch rotor, such as the rotors depicted in FIGS. 1-4 and 6-11, mounted on a High Speed Multi-Rotor VTOL aircraft.
Figure 12B:
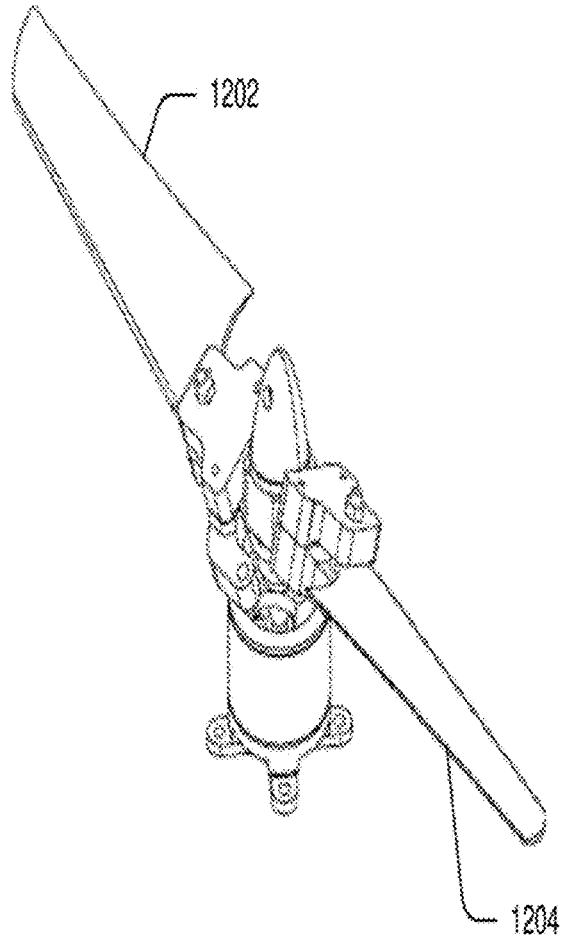

FIGS. 12A-12B are perspective views of a variable pitch rotor. In various embodiments, the rotors, such as rotor 110, may be variable pitch. As discussed above with respect to FIG. 9, the rotors may adjust pitch to change from a push-type rotor to a pull-type rotor.

In various embodiments the rotors 1202 and 1204 may move in the equivalent but opposite directions. In some embodiments, the rotors 1202 and 1204 may move independently of one another. Each rotor 1202 and 1204 may be free to rotate 360 degrees about its own axis.

FIGS. 13A-13D are isometric views of an illustrative rotating assembly 1300 that moveably couples a rotor unit to the fuselage 102 of the illustrative VTOL aircraft 700.

Figures 13A, 13B:
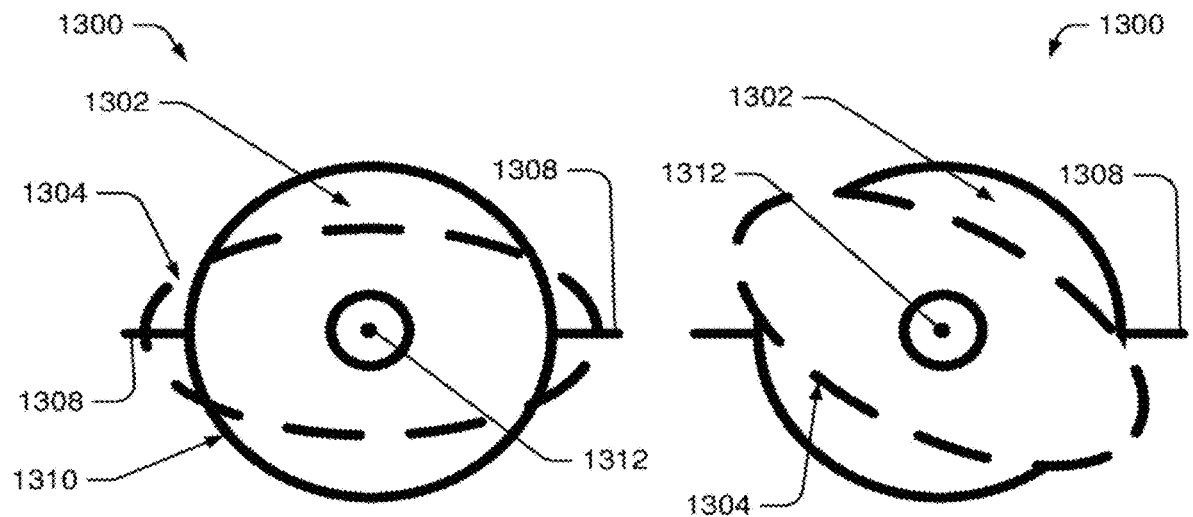
FIGS. 13A-13D are isometric views of an illustrative rotating assembly that connects a cockpit to the fuselage, the main wing, and/or the vertical wing of the illustrative VTOL aircraft.

FIG. 13A shows the illustrative rotating assembly 1300 including a cockpit 1302. The cockpit 1302 is mounted in a rotating chassis 1304, which allows rotation about its lateral and longitudinal axis. The rotating chassis 1304 may include a pivot joint 1108, which holds the cockpit 1302 in place. The pivot joint 1308 may include a locking mechanism to lock cockpit 1302 in one position. The dashed line depicts the cockpit in the transition mode 204-208.

As illustrated in FIG. 13B, the rotating assembly may include a second pivot joint 1312, which may allow rotation about the longitudinal axis of the cockpit 1302. The rotation about the longitudinal axis may be desired during a transition from a main wing loading horizontal flight configuration to a vertical wing loading horizontal flight configuration, in which case, the cockpit 1302 may rotate about the longitudinal axis to maintain an upright position.

Figure 13C:
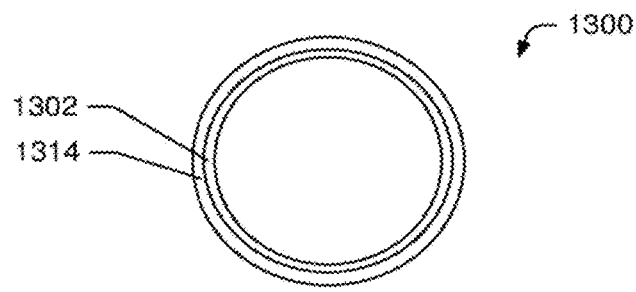
Figure 13D:
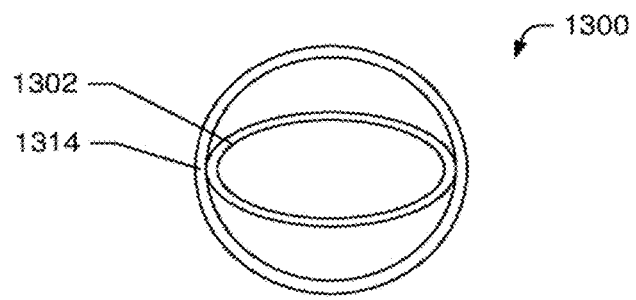

FIG. 13C shows the illustrative rotating assembly 1300 with an outer frame 1314 supporting the cockpit 1302. The outer frame 1314 and the cockpit 1302 are rotatable with respect to each other about the lateral axis, as shown in FIG. 13D. The fuselage, the main wing, and/or the vertical wing of the VTOL aircraft 700 may provide the outer frame 1314, or the outer frame 1314 may be coupled to the fuselage, the main wing, and/or the vertical wing. In some embodiments, the rotating chassis may be a gimbaled chassis and/or a pivoting chassis.

Figure 14:
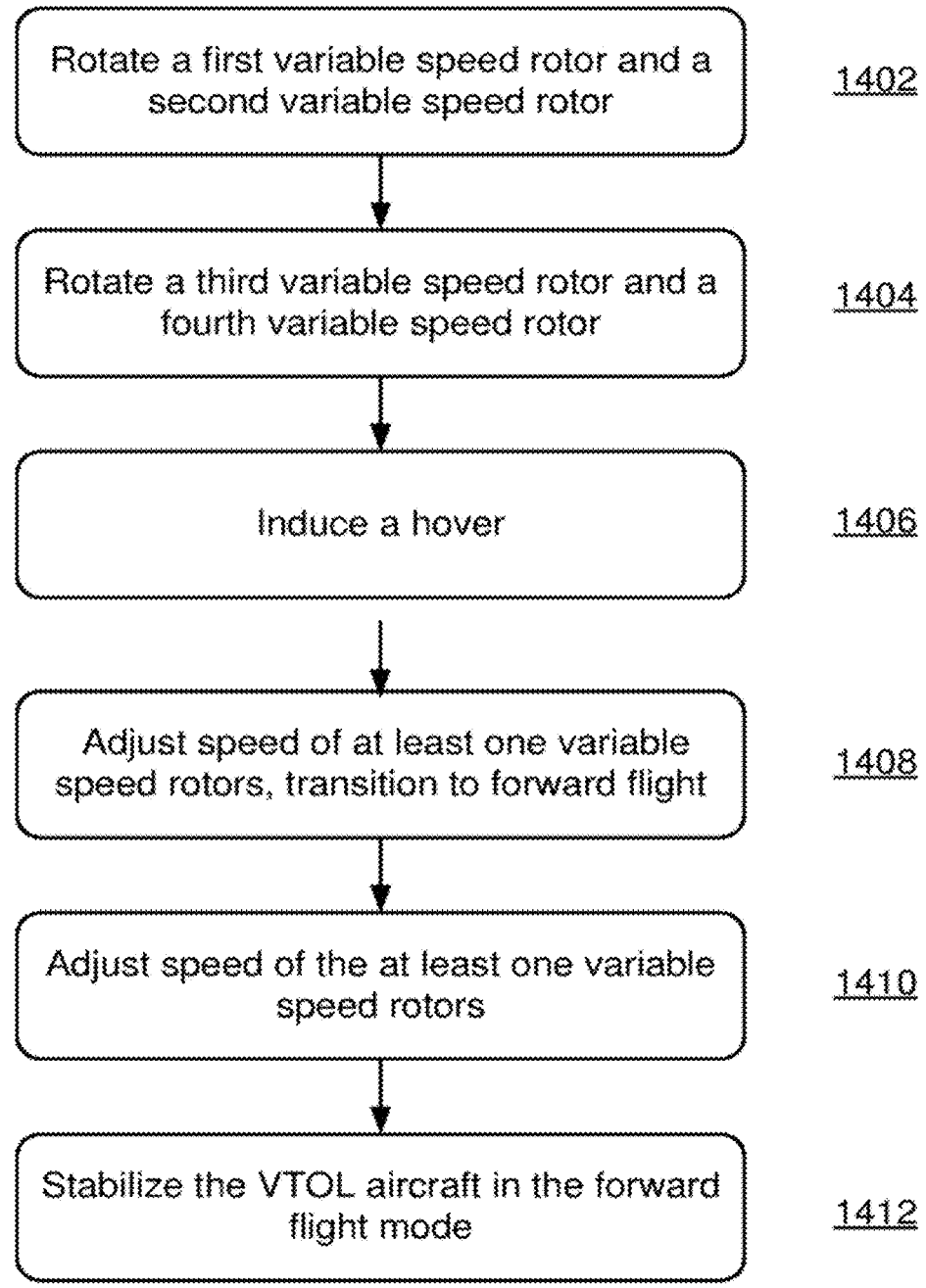
FIG. 14 is a flow diagram showing a transition from takeoff, through a transition mode, to a forward flight mode.

FIG. 14 is a flow diagram showing a transition from takeoff, through a transition mode, to a forward flight mode.

At block 1402, the VTOL aircraft rotates a first variable speed rotor and a second variable speed rotor. The first and the second variable speed rotors may rotate at substantially the same speed. However, the first and the second variable speed rotors may rotate independently of one another.

At block 1404, the VTOL aircraft rotates a third variable speed rotor and a fourth variable speed rotor. The third variable speed rotors may rotate at substantially the same speed as the fourth variable speed rotor. However, the third and the fourth variable speed rotors may rotate independently of one another, and independently of the first and the second variable speed rotors. In some embodiments, the third and the fourth variable speed rotors may rotate at substantially the same speed as the first and second variable speed rotors. In some embodiments, the third and the fourth variable speed rotors may rotate at a different speed than the first and the second variable speed rotor.

Prior to takeoff, the first, second, third and fourth variable speed rotors may rotate at a speed to produce minimal thrust (i.e., not enough thrust to overcome the weight of the VTOL aircraft). In various embodiments, at least two of the first, second, third, and fourth variable speed rotors may be configured to produce downward thrust to keep the aircraft grounded and/or stable.

At block 1406, the VTOL aircraft may increase the speed of the first, second, third, and fourth variable speed rotors to induce a hover. The speed of the rotors may be sufficient to provide thrust to overcome the weight of the VTOL aircraft. While in a hover, the first, second, third, and fourth variable speed rotors may rotate at substantially the same speed. The speed of each of the first, second, third, and fourth variable speed rotors may be adjusted by the control management system to maintain a stable hover with little to no horizontal movement.

At block 1408 the control management system may adjust the speed of at least one variable speed rotor to effect a transition to forward flight. In some embodiments, the control management system may increase or decrease the speed of one variable speed rotor to effect a roll about the lateral or longitudinal axis of the VTOL aircraft. In some embodiments, the control management system may increase the speed of one rotor while decreasing the speed of the opposite rotor on the same wing to effect a roll about the lateral or longitudinal axis. For example, the third variable speed rotor may increase rotation speed while the fourth variable speed rotor may decrease rotation speed, thereby effecting the transition.

At block 1410, the control management system may adjust the speed of the at least one variable speed rotor from block 1408 to substantially the same speed as the other variable speed rotors. In some embodiments, the rotor opposite the at least one variable speed rotor adjusted in block 1408 may rotate at a speed necessary to counter the rotation of the VTOL aircraft about the longitudinal or lateral axis.

At block 1412, the VTOL aircraft may stabilize in the forward flight mode, with the first, second, third and fourth variable speed rotors rotating at substantially the same speed and producing thrust substantially parallel with the horizon.

Figure 15:
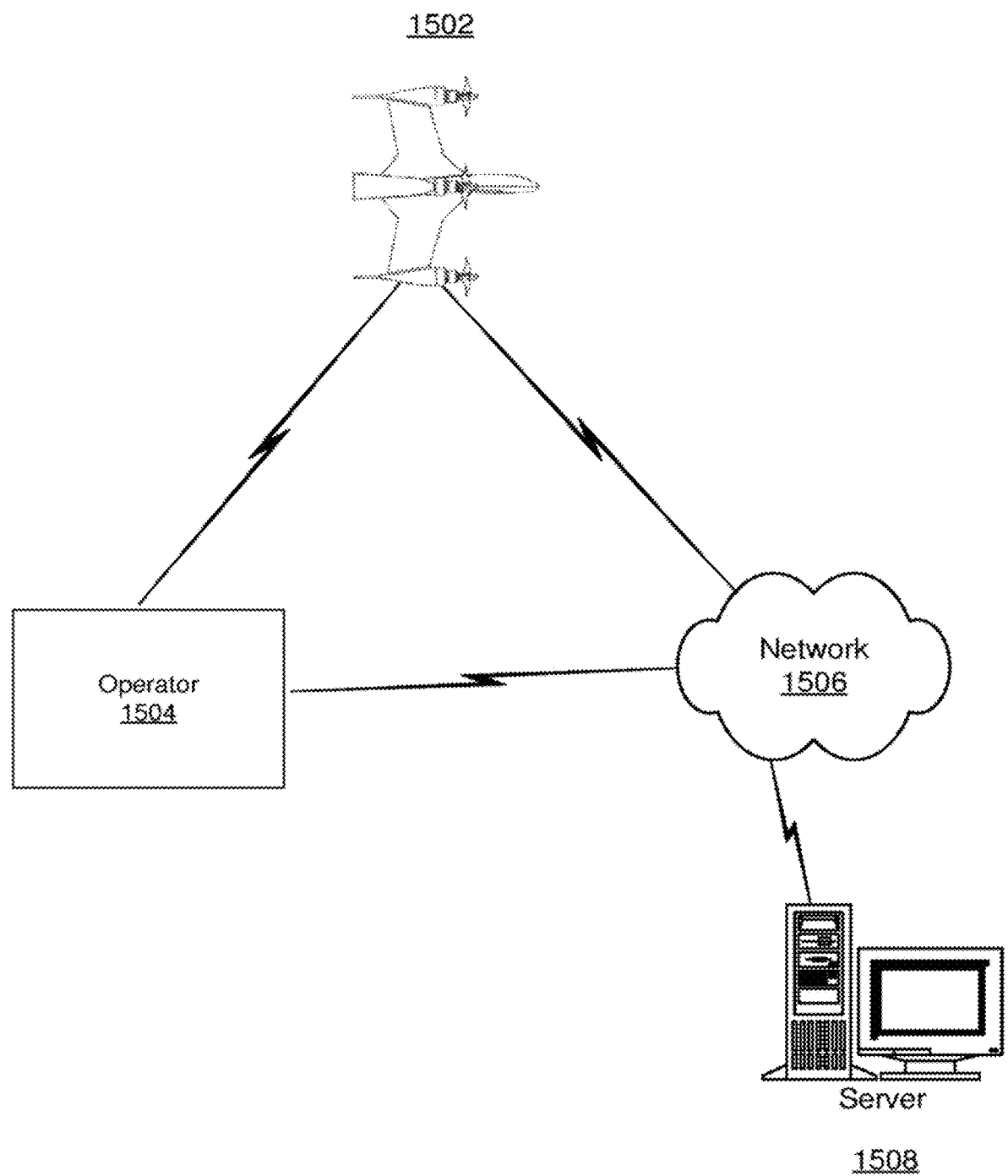
FIG. 15 is an illustrative environment in which the VTOL aircraft, such as VTOL aircraft 100 may operate.

FIG. 15 is an illustrative environment in which the VTOL aircraft, such as VTOL aircraft 100 may operate.

As illustrated in FIG. 15, the VTOL aircraft 1502 may communicate with an operator 1504 via one or more networks 1506. The network may be controlled by one or more servers, such as server 1508. The network 1506 can include public networks such as the Internet, private networks such as an institutional and/or personal intranet, or some combination of private and public networks. Network(s) 1506 can also include any type of wired and/or wireless network, including but not limited to local area networks (LANs), wide area networks (WANs), personal area networks (PANs), near field communications (NFC), cable networks, Wi-Fi networks, WiMax networks, mobile communication networks (e.g., 3G, 4G, and so forth), or any combination thereof.

Communication between the operator 1504 and the VTOL aircraft 1502 may be possible via a wired or a wireless signal, including but not limited to, Bluetooth, radio control, voice control, electromagnetic waves, Wi-Fi signals, cell phone signals, or some combination thereof. Operator 1504 may send the signals via network 1506 to a control management system, such as control management system 612. Upon receiving the signals, control management system may adjust the propulsion system and/or flight controls as necessary to reflect the desire of the operator 1504.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A vertical take-off and landing (VTOL) aircraft comprising:
   a first wing;
   a second wing;
   a first propulsion system coupled to the first wing, the first propulsion system coupled to the first wing configured to produce vertical lift while the aircraft is in a hover regime and longitudinal thrust when the aircraft is in a forward flight regime, the first propulsion system coupled to the first wing configured to provide thrust vectoring;
   a second propulsion system coupled to the second wing, the second propulsion system coupled to the second wing configured to produce vertical lift while the aircraft is in the hover regime and longitudinal thrust when the aircraft is in the forward flight regime, the second propulsion system coupled to the second wing configured to provide thrust control;
   at least one onboard rechargeable battery;
   a control management system configured to direct the thrust control to adjust an orientation of the aircraft; and
   wherein at least one of said first propulsion system or said second propulsion system comprises a power system and at least one foldable and variable speed rotor that is coupled to the power system and operative in an unlocked state to fold backward into a feathered position toward an aft end of the VTOL aircraft, and wherein said at least one foldable and variable speed rotor, when allowed to freely spin in the unlocked state, produces electricity to charge said at least one onboard rechargeable battery.

2. The aircraft as claim 1 recites, wherein said at least one foldable and variable speed rotor is capable of either freely spinning when in the unlocked state in the feathered position, or prohibited from freely spinning when in a locked state in the feathered position.

3. The aircraft as claim 2 recites, wherein the power system comprises:
   an electric motor; and
   a power source to provide power to the electric motor.

4. The aircraft as claim 3 recites, wherein the power source comprises at least one of:
   a battery;
   a solar panel;
   a fuel cell; or
   a wind turbine generator.

5. The aircraft as claim 2 recites, wherein the power system comprises one of a combustion engine or a hybrid engine.

6. The aircraft as claim 2 recites, wherein the aircraft is configured to transition between the hover and the forward flight regime by adjusting a speed of at least one of the first propulsion system, the second propulsion system, or a combination thereof.

7. The aircraft as claim 2 recites, wherein the at least one foldable and variable speed rotor is a variable pitch rotor.

8. The aircraft as claim 7 recites, wherein the aircraft is configured to transition between the hover and the forward flight regime by adjusting a pitch of said at least one foldable and variable speed rotor.

9. The aircraft as claim 1 recites, wherein the thrust control from at least one of the first propulsion system or second propulsion system adjusts at least one of the pitch, roll, and yaw of the aircraft.

10. The aircraft as claim 1 recites, the second wing being coupled to the first wing at a 90-degree angle, wherein the second wing has a smaller wingspan than the first wing, the aircraft being configured to fly:
with the first wing producing lift in the forward flight regime; or
with the second wing producing lift in the forward flight regime.

11. The aircraft as claim 1 recites, further comprising at least one of:
an elevon; and
a rudder;
wherein the control management system is further configured to adjust the at least one elevon and the at least one rudder.

12. The aircraft as claim 1 recites, the control management system further comprising one or more of:
an accelerometer;
a gyro;
a magnetometer;
a GPS receiver; or
an optical sensor, wherein the accelerometer, the gyro, the magnetometer, the GPS receiver, and the optical sensor provide input to the control management system to allow autonomous flight.

13. The aircraft as claim 1 recites, further comprising:
a third propulsion system coupled to the first wing; and
a fourth propulsion system coupled to the second wing;
wherein the first, second, third, and fourth propulsion systems each comprises an engine and at least one foldable and variable speed rotor, and each of the first, second, third and fourth propulsion systems being configured to operate independently.

14. The aircraft as claim 13 recites, wherein the rotors of the first, second, third, and fourth propulsion systems are pusher-type rotors.

15. The aircraft as claim 1 recites, further comprising a passenger compartment configured to hold at least one person.

16. The aircraft as claim 1 recites, further comprising a storage pod, the storage pod housing at least one camera configured to transmit imagery to at least an operator of the aircraft.

* * * * *